US005913445A

United States Patent [19]
Fujii et al.

[11] Patent Number: 5,913,445
[45] Date of Patent: Jun. 22, 1999

[54] INSULATED SYNTHETIC RESIN CONTAINER AND INSULATED SYNTHETIC RESIN LID

[75] Inventors: Takafumi Fujii; Masashi Yamada; Kensuke Furuyama; Atsuhiko Tanaka; Hidefumi Kamachi, all of Tokyo, Japan

[73] Assignee: Nippon Sanso Corporation, Tokyo, Japan

[21] Appl. No.: 09/043,518

[22] PCT Filed: May 12, 1997

[86] PCT No.: PCT/US97/07892

§ 371 Date: Mar. 19, 1998

§ 102(e) Date: Mar. 19, 1998

[87] PCT Pub. No.: WO98/05573

PCT Pub. Date: Feb. 12, 1998

[30] Foreign Application Priority Data

Aug. 7, 1996 [JP] Japan .................................. 8-208684

[51] Int. Cl.⁶ ........................................................ B65D 5/58
[52] U.S. Cl. ..................... 220/574; 215/13.1; 220/592.27
[58] Field of Search ................................. 215/13.1, 12.1; 220/574, 574.2, 574.3, 575, 592.27, 592.28, 592.21, 592.2, 592.05, 592.09, 921, 918, 62.18, 627, 645, 495.04, 503, 506

[56] References Cited

U.S. PATENT DOCUMENTS

| | | |
|---|---|---|
| 844,272 | 2/1907 | Fate . |
| 999,672 | 8/1911 | Puffer . |
| 1,165,952 | 12/1915 | Dunlap . |
| 1,297,910 | 3/1919 | Rhea ................................. 220/592.27 |
| 1,475,405 | 11/1923 | O'Brien ............................. 220/592.27 |
| 2,144,820 | 1/1939 | Thomas ............................. 220/592.27 |
| 2,538,524 | 1/1951 | Joseph ................................ 220/62.18 |
| 3,149,741 | 9/1964 | Bergan ............................. 220/592.21 |
| 3,232,468 | 2/1966 | Rownd ................................ 215/13.1 |
| 3,311,249 | 3/1967 | Bell ................................... 220/592.27 |
| 5,080,146 | 1/1992 | Arasteh . |
| 5,678,725 | 10/1997 | Yamada et al. ..................... 220/62.18 |
| 5,769,262 | 6/1998 | Yamada et al. ....................... 215/13.1 |

FOREIGN PATENT DOCUMENTS

| | | |
|---|---|---|
| 56-75123 | 6/1981 | Japan . |
| 4-32644 | 3/1992 | Japan . |

*Primary Examiner*—Stephen Castellano
*Attorney, Agent, or Firm*—Darby & Darby

[57] ABSTRACT

An insulated synthetic resin container 1 is provided by forming a container having a double walled structure by integrating a synthetic resin inner container 4 and a synthetic resin outer container 3 separated by a space 5 and forming an insulating layer 6 by enclosing a gas having low thermal conductivity in space 5 of the above-mentioned container. This insulated synthetic resin container 1 comprises a gas replacement penetrating hole formed in the center of one of the synthetic resin inner container 4 and synthetic resin outer container 3; and a contact preventing projection 14 formed in the vicinity of this gas replacement penetrating hole 7 projecting into the insulating layer 6 from the surface in which this penetrating hole 7 is formed or from the opposite surface. Due to this structure, when enclosing the above-mentioned gas in the space 5, vacuum evacuation to exchange the gas inside of space 5 is conducted, and the inner container 4 and outer container 3 are deformed without contact, thereby, efficient vacuum evacuation is possible, and excellent insulating ability is obtained.

12 Claims, 16 Drawing Sheets

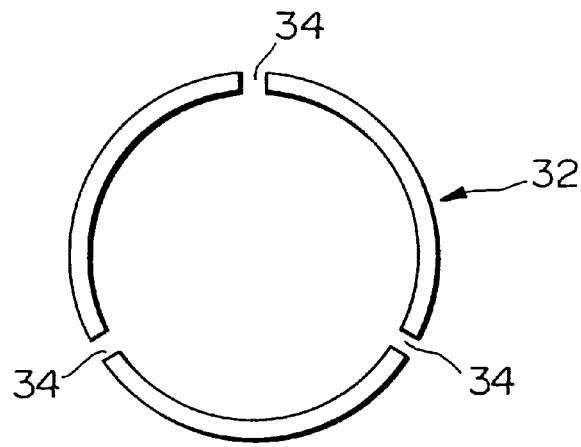
FIG.9A
FIG.9B
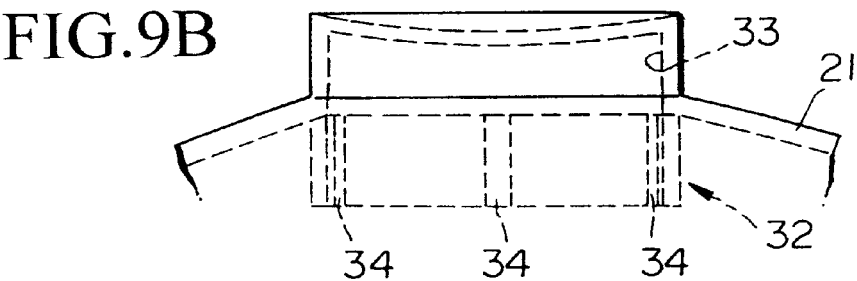
FIG.10A
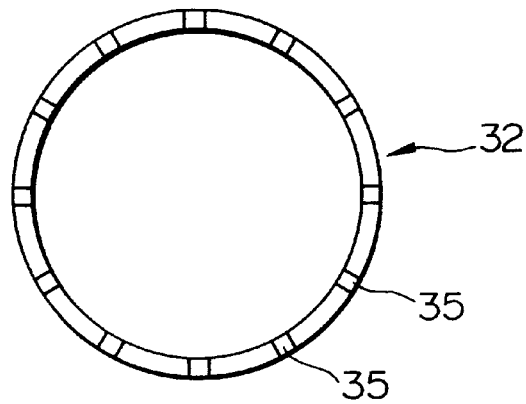
FIG.10B
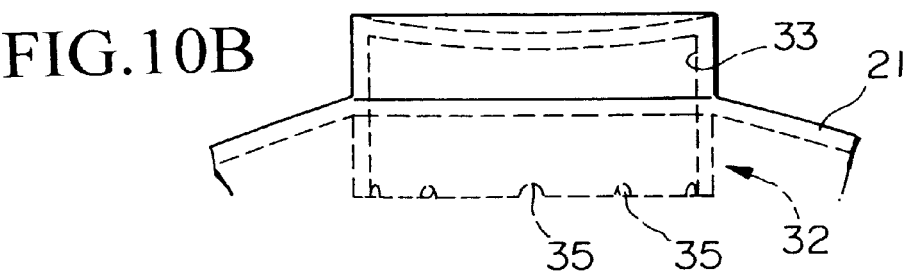

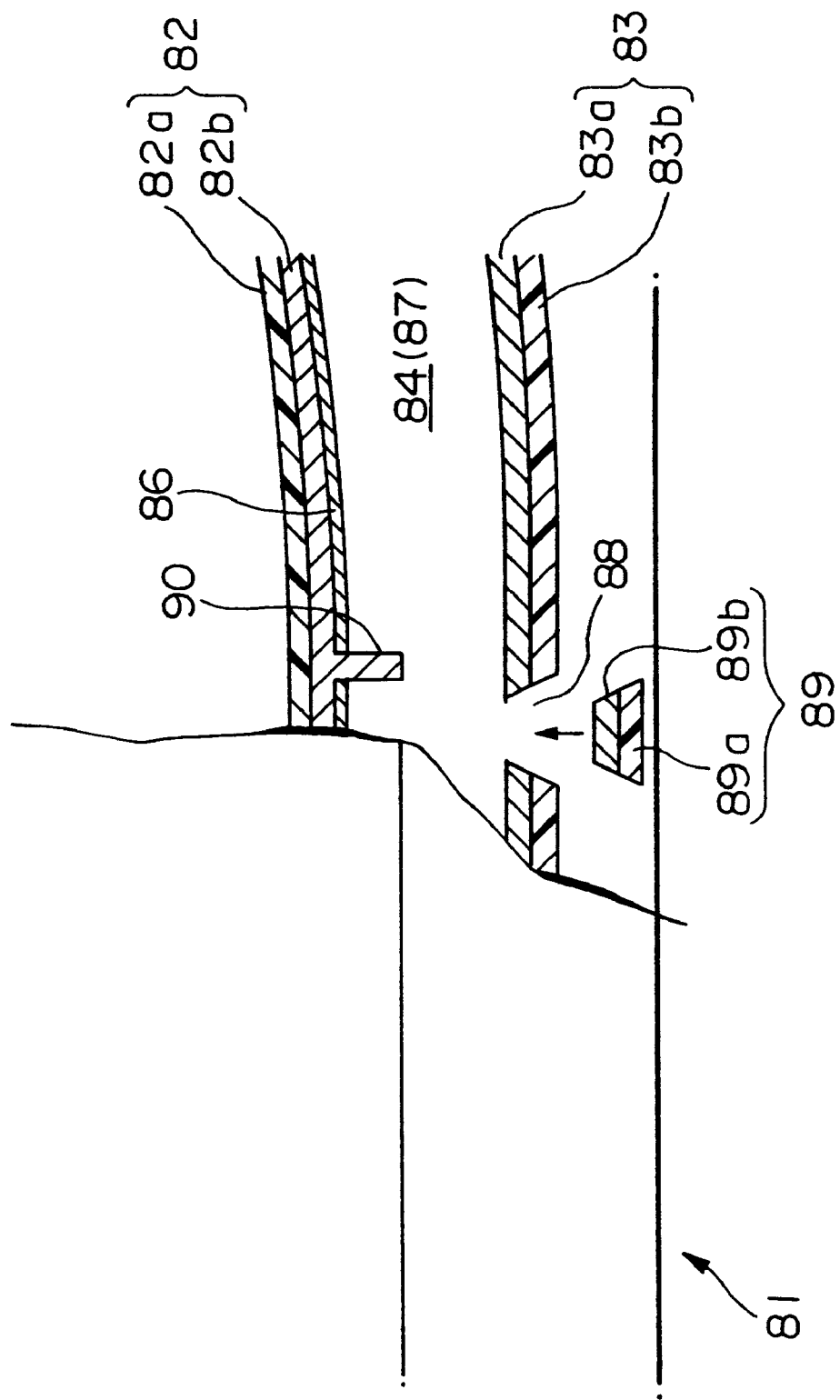

INSULATED SYNTHETIC RESIN CONTAINER AND INSULATED SYNTHETIC RESIN LID

FIELD OF THE INVENTION

The present invention relates to insulated containers and insulated lids for use in vacuum flasks, cooler boxes, ice boxes, insulated cups, temperature maintaining lunch boxes, and the like. More specifically, the present invention relates to insulated synthetic resin containers and insulated synthetic resin lids which have a double wall structure which encloses an insulating layer in which a gas having low thermal conductivity has been sealed. A contact preventing projection is formed on the insulating layer side of one of the walls of the double wall structure, this projection supports the other wall which is elastically deformed during the vacuum evacuation of the space formed between the double wall when replacing the gas, as a result, efficient gas replacement is possible, and the insulated synthetic resin container and the insulated synthetic resin lid have excellent insulating performance.

BACKGROUND OF THE INVENTION

Up to the present, for insulated containers which can be used as vacuum flasks, temperature maintaining lunch boxes, and the like, development of insulated synthetic resin containers, which have the advantages of being light weight, easily molded and for which manufacturing costs are low, have been progressing. As this type of insulated synthetic resin container, a container having a lid which can be fitted thereto having the following structure has been proposed. This container is an insulated container formed from an inner container and an outer container which are formed from synthetic resin. The inner container and the outer container which is dimensionally larger than the inner container are put together leaving a space therebetween, and the inner and outer containers are then joined at the respective edges of their mouth parts to give a double walled container. Then a gas having low thermal conductivity comprising at least one gas from the group consisting of xenon, krypton, and argon is enclosed in the space formed between the inner and outer containers. In the same way, the lid is an insulated lid formed from a bottom surface wall and a top surface wall which are formed from synthetic resin. The bottom surface wall and the top surface wall, which is dimensionally larger than the bottom surface wall, are put together leaving a space therebetween, and the top and bottom surface walls are then joined at the respective edges of their mouth parts to give a double walled lid. Then a gas having low thermal conductivity comprising at least one gas from the group consisting of xenon, krypton, and argon is enclosed in the space formed between the top and bottom surface wall.

After the joining of the inner and outer containers to form a double walled container, the above-mentioned insulated synthetic resin container requires a process of vacuum evacuation of the space formed between these inner and outer containers and a subsequent process of charging this space with gas, therefore, for this purpose, a penetrating hole (hereinafter referred to as a penetrating hole) which is an evacuation hole and a gas charging hole is provided in either of the inner container or outer container.

In the same way, after the joining of the top and bottom surface walls to form a double walled lid, the above-mentioned insulated synthetic resin lid requires a process of vacuum evacuation of the space formed between these top and bottom surface walls and a subsequent process of charging this space with gas, therefore, for this purpose, a penetrating hole which is an evacuation hole and a gas charging hole is provided in either of the top surface wall or the bottom surface wall.

When vacuum evacuating the contents of the insulating layer between the inner and outer containers or the top and bottom surfaces having the above-mentioned structure, the space of the insulating layer becomes gradually narrower due to deformation of the inner container and the outer container, and the top surface wall and the bottom surface wall bear the load of atmospheric pressure due to a reduction in pressure within the insulating layer. For this reason, a problem arises in which the surfaces on the insulating layer side (in other words, the outer surface of the inner container and the inner surface of the outer container, or the upper surface of the bottom surface wall and the lower surface of the top surface wall) touch and the penetrating hole for gas replacement becomes stopped up. When the penetrating hole becomes stopped up, then problems such as the following also arise.

First, during the evacuation process, resistance to evacuation becomes large and a long period of time is necessary to obtain a sufficient vacuum. In addition, situations in which the penetrating hole becomes stopped up are not all the same, so it becomes difficult to establish an evacuation time period. If the value for the evacuation time period is too short, the vacuum is insufficient, and it is not possible to introduce sufficient gas having low thermal conductivity after the vacuum evacuation.

In addition, even when vacuum evacuation is achieved, during the subsequent gas charging process, the stopped up hole results in resistance to the introduction of gas, the introduction of the gas having low thermal conductivity cannot be completed in the established time period, and because it is returned to atmospheric pressure while still in a low pressure condition, it is not possible to introduce sufficient gas having low thermal conductivity.

Furthermore, when injection molding containers which have a symmetric structure, such as kitchen and table ware, a gate is generally provided in the center of the lower surface so that the properties of injection molding will be good, weld generation will be low, and so that eccentricity in shape after the molding process can be reduced as much as possible.

However, for a double walled structure, in a vacuum evacuation process like the one mentioned above, due to the effects of atmospheric pressure, the weld mark (in particular, a pin point gate) which is in the center of the bottom surface of the inner container becomes inserted into the gas replacement penetrating hole which is in the center of the bottom of the outer container, the hole becomes stopped up and vacuum evacuation becomes impossible. For this reason, the use of a pingate in molding a container is limited, and there are problems with automation of the molding and stabilization of the cycle time.

In order to avoid this type of deformation caused by vacuum evacuation, up to the present, it has been necessary to mold the walls of containers and lids thickly. For example, when the material used is polycarbonate, a thickness of approximately 3 mm is necessary. However, when the walls are made thick, costs increase and, furthermore, it is necessary to make the space for the insulating layer thinner by the amount that the walls are made thicker, or it is necessary to make the shape of the inner and outer containers or the top and bottom surface walls larger. When the insulating layer is made thinner, the effective insulation performance of maintaining high or low temperatures is reduced. In addition, when the containers are made larger, efficient utility of space is reduced, and a problem arises in the promotion of low holding capacity increases the required space in the storage place.

DISCLOSURE OF THE INVENTION

In light of the above-mentioned matters, the present invention has as an object the provision of an insulated synthetic resin container and an insulated synthetic resin lid which have double walled structures with which it is possible for vacuum evacuation and gas replacement to be efficiently conducted without the above-mentioned penetrating hole becoming stopped up even when the walls (such as the walls of the inner and outer container or the top and bottom surface walls) on both sides of the space for the insulating layer become deformed during the vacuum evacuation of the space of the container and lid having this double wall structure.

The insulated synthetic resin container of the present invention may comprise an insulating layer formed by enclosing a gas having a thermal conductivity lower than air in a space formed between an inner container and an outer container of a double walled container in which the above-mentioned inner container and the above-mentioned outer container have been joined into a single body, wherein a gas replacement penetrating hole is formed in a center of a bottom of one of the above-mentioned inner container or the above-mentioned outer container, and a contact preventing projection is provided in the vicinity of the abovementioned gas replacement penetrating hole projecting into the above-mentioned insulating layer from at least one of a surface in which the above-mentioned gas replacement penetrating hole is formed or a surface which is opposite the above-mentioned surface in which the abovementioned gas replacement penetrating hole is formed.

Alternatively, the insulated synthetic resin container of the present invention may comprise an insulation layer body housed within a space formed between an inner container and an outer container of a double walled container in which the above-mentioned inner container and the above-mentioned outer container are joined into a single body, and the above-mentioned insulation layer body comprises an insulating layer formed by enclosing a gas having low thermal conductivity having a thermal conductivity lower than air in a space formed between an inner wall and an outer wall of a double walled structure in which said inner wall and said outer wall are joined into a single body, wherein a gas replacement penetrating hole is formed in a center of a bottom of one of the above-mentioned inner wall and the abovementioned outer wall; and a contact preventing projection is provided in the vicinity of the above-mentioned gas replacement penetrating hole, projecting into the above-mentioned insulating layer from at least one of a surface in which the above-mentioned gas replacement penetrating hole is formed and a surface which is opposite the above-mentioned surface in which the above-mentioned gas replacement penetrating hole is formed.

In addition, the insulated synthetic resin container may comprise an insulating layer formed by enclosing a gas having low thermal conductivity having a thermal conductivity lower than air into a space formed between an inner container and an outer container of a double walled container in which said inner container and said outer container have been joined into a single body and said inner container and said outer container have been formed by means of multi-color molding in which synthetic resins having different functional properties are made into layers, wherein a gas replacement penetrating hole is formed in a center of a bottom of one of an outer layer of the above-mentioned inner container or an inner layer of the abovementioned outer container; and a contact preventing projection is provided in the vicinity of the above-mentioned gas replacement penetrating hole projecting into the above-mentioned insulating layer from at least one of a surface in which the above-mentioned gas replacement penetrating hole is formed and a surface which is opposite the above-mentioned surface in which the above-mentioned gas replacement penetrating hole is formed.

The insulated synthetic resin lid of the present invention comprises an insulating layer formed by enclosing a gas having low thermal conductivity having a thermal conductivity lower than air in a space formed between a top surface wall and a bottom surface wall of a double walled lid in which the above-mentioned top surface wall and the above-mentioned bottom surface wall have been joined into a single body, wherein a gas replacement penetrating hole is formed in a center of the wall of one of the above-mentioned top surface wall and the above-mentioned bottom surface wall; and a contact preventing projection is provided in the vicinity of the above-mentioned gas replacement penetrating hole projecting into the abovementioned insulating layer from at least one of a surface in which the above-mentioned gas replacement penetrating hole is formed and a surface which is opposite the above-mentioned surface in which the above-mentioned gas replacement penetrating hole is formed.

Alternatively, the insulated synthetic resin lid of the present invention may comprise an insulation layer body housed within a space formed between a top surface wall and a bottom surface wall of a double walled lid in which the above-mentioned top surface wall and the above-mentioned bottom surface wall are joined into a single body, and the above-mentioned insulation layer body comprises an insulating layer formed by enclosing a gas having low thermal conductivity having a thermal conductivity lower than air in a space formed between an upper wall and a lower wall of a double walled structure in which the above-mentioned upper wall and the above-mentioned lower wall are joined into a single body, wherein a gas replacement penetrating hole is formed in a center of one of the above-mentioned upper wall and the above-mentioned lower wall; and a contact preventing projection is provided in the vicinity of the above-mentioned gas replacement penetrating hole, projecting into the abovementioned insulating layer from at least one of a surface in which the above-mentioned gas replacement penetrating hole is formed and a surface which is opposite the above-mentioned surface in which the above-mentioned gas replacement penetrating hole is formed.

In addition, the insulated synthetic resin lid of the present invention may comprise an insulating layer formed by enclosing a gas having low thermal conductivity having a thermal conductivity lower than air into a space formed between a top surface wall and a bottom surface wall of a double walled lid in which the above-mentioned top surface wall and the above-mentioned bottom surface wall have been joined into a single body and the abovementioned bottom surface wall and the above-mentioned top surface wall have been formed by means of multi-layer molding in which synthetic resins having different functional properties are made into layers, wherein a gas replacement penetrating hole is formed in a center of one of the above-mentioned top surface wall and the above-mentioned bottom surface wall; and a contact preventing projection is provided in the vicinity of the above-mentioned gas replacement penetrating hole projecting into the above-mentioned insulating layer from at least one of a surface in which the above-mentioned gas replacement penetrating hole is formed and a surface which is opposite the above-mentioned surface in which the above-mentioned gas replacement penetrating hole is formed.

Furthermore, in the present invention, a structure in which at least a part of the tip of each of the above-mentioned contact preventing projections is separated from an opposite surface is also possible.

BRIEF EXPLANATION OF THE FIGURES

FIG. 4A is a bottom view of the contact preventing projection, and FIG. 4B is a side view of the center of the bottom surface of the inner container.

FIG. 5A is a bottom view of the contact preventing projection, and FIG. 5B is a side view of the center of the bottom surface of the inner container.

FIG. 9A and FIG. 9B show an example of a contact preventing projection which is provided in the lower surface of the top surface wall of the insulated synthetic resin lid of the present invention; FIG. 9A is a bottom view of the contact preventing projection, and FIG. 9B is a side view of the center of the upper surface of the top surface wall.

FIG. 10A and FIG. 10B show another example of a contact preventing projection which is provided in the lower surface of the top surface wall of the insulated synthetic resin lid of the present invention; FIG. 10A is a bottom view of the contact preventing projection, and FIG. 10B is a side view of the center of the upper surface of the top surface wall.

FIG. 11A is a bottom view of the contact preventing projection and FIG. 11B is a partial cross section of the center of the lower surface of the top surface wall.

FIG. 15A is a bottom view of the contact preventing projection and FIG. 15B is a side view of the center of the bottom surface of the inner container.

FIG. 16A is a bottom view of the contact preventing projection and FIG. 16B is a side view of the central section of the bottom surface of the inner container.

FIG. 17A is a top view of the contact preventing projection and FIG. 17B is a side view of the central section of the upper surface of the bottom surface wall.

FIG. 18A is a top view of the contact preventing projection and FIG. 18B is a side view of the central section of the upper surface of the bottom surface wall.

FIG. 20 is an enlarged partial cross-section of the central section of the bottom of the multi-layer molded insulated synthetic resin container of the present invention shown in FIG. 19.

FIG. 21A is a bottom view of the contact preventing projection and FIG. 21B is a side view of the center of the bottom surface of the inner container.

FIG. 22A is a bottom view of the contact preventing projection and FIG. 22B is a side view of the central section of the bottom surface of the inner container.

FIG. 23A is a bottom view of the contact preventing projection and FIG. 23B is a side view of the central section of the upper surface of the top surface wall.

FIG. 24A is a bottom view of the contact preventing projection and FIG. 24B is a side view of the central section of the upper surface of the top surface wall.

BEST MODE FOR CARRYING OUT THE INVENTION

The insulated synthetic resin container (hereinafter referred to as "insulated container") and insulated synthetic resin lid (hereinafter referred to as "insulated lid") of the present invention comprise a contact preventing projection formed on the insulating layer side of one of the walls of the insulated container or the insulated lid which have a double walled structure which encloses an insulating layer in which a gas having low thermal conductivity is enclosed. This contact preventing projection is for the purpose of supporting the other wall which is elastically deformed during gas replacement. By means of this contact preventing projection, stopping up of the penetrating hole, which is used for gas replacement, by the opposite surface which is arranged on the other side of the insulating layer or by the pingate which is formed in this opposite surface is prevented.

In the following, a more detailed explanation of the present invention will be made with reference to the Figures.

Figure 1:
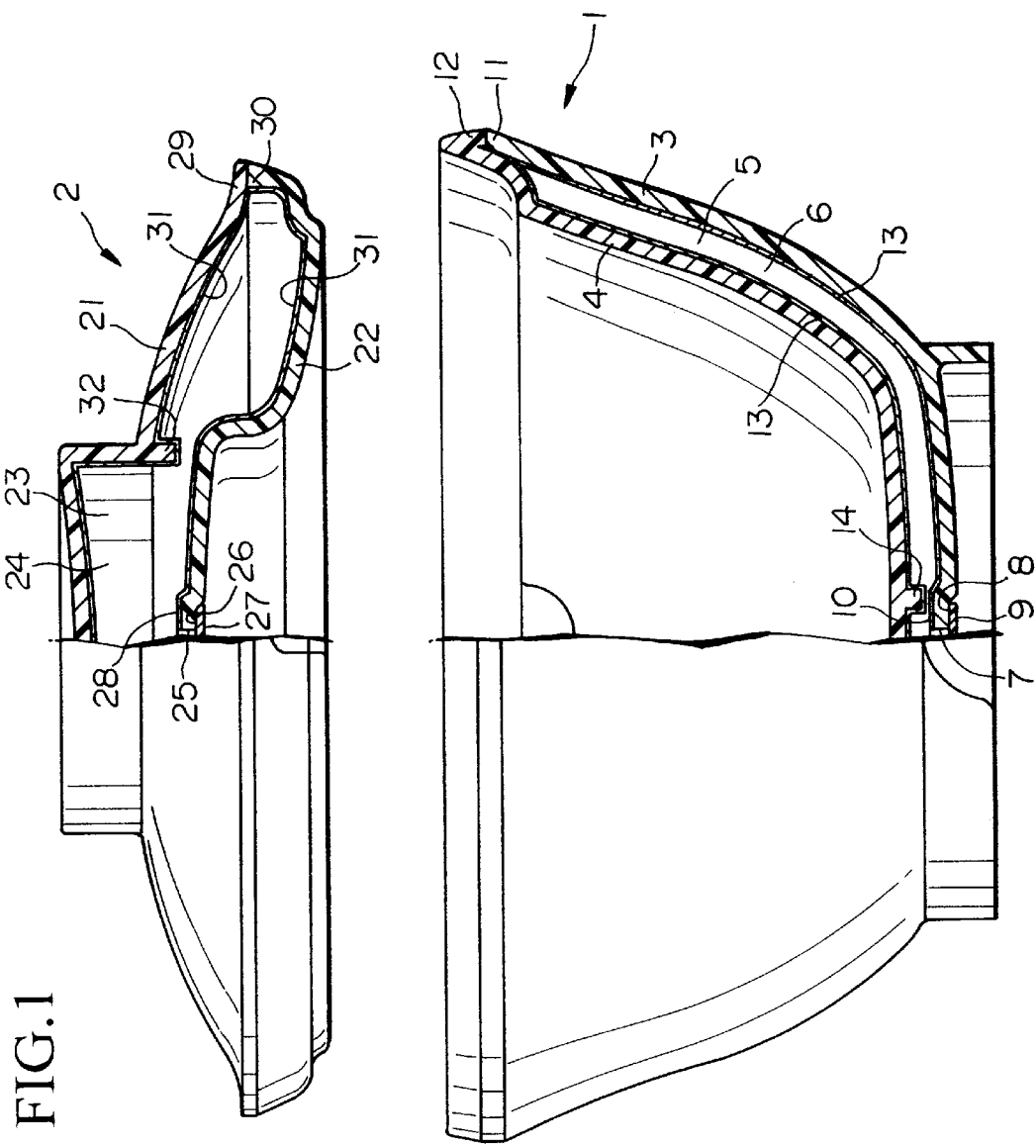
FIG. 1 is a partial cross-section showing an embodiment of an insulated synthetic resin container and insulated synthetic resin lid according to the present invention.

FIG. 1 shows a preferred embodiment of the insulated container 1 and the insulated lid 2, which covers the opening of the insulated container 1 in a removable manner, of the present invention.

This insulated container 1 has a bowl or Chinese bowl shape and has a double walled structure formed by an outer container 3 and an inner container 4 which are molded by injection molding polyester resin, ABS resin, polypropylene resin, polycarbonate resin, or the like which have thermal and water resisting properties. In addition, this insulated container 1 comprises a space 5 between the inner and outer containers which forms an insulating layer 6.

The outer container 3 and the inner container 4 are formed by injection molding using the pingate method.

In the center of the bottom of the outer container 3, a penetrating hole 7 is formed. Surrounding this penetrating hole 7 and with penetrating hole 7 at its center, a concentric circle shaped indented section 8 is formed in the outer surface side of the outer container 3. A sealing plate 9 can be fitted into this indented section 8. In addition, a concentric circle shaped projecting section 10 is formed, with the penetrating hole 7 at its center, in the inner surface side (the insulating layer side) of the outer container 3 and which corresponds to the indented section 8, such that the thickness of the vicinity of the center of the bottom of the outer container 3 is the same as other parts of the bottom of the outer container 3.

When the wall thickness of the central section of the bottom of outer container 3 is molded in such a way that it is approximately identical in thickness to other parts, it is possible to avoid reducing the strength of the central section of the bottom of the outer container 3, and this is particularly advantageous for kitchen and table ware made from double walled containers for which the thickness of the inner container and the outer container must be thin compared with those of cooler boxes, temperature maintaining lunch boxes, and the like.

The above-mentioned indented section 8 is for the purpose of inserting and adhering sealing plate 9, and the depth of the indented section 8 is formed such that it is equal to the thickness of the sealing plate 9 which is formed from the same resin as the inner and outer containers. By means of this type of structure, after the insulated container 1 is assembled, the bottom of the insulated container 1 can be made smooth, the appearance and handling are superior, and cleaning is simple.

The above-mentioned penetrating hole 7 is provided in the bottom of the outer container 3. During the manufacturing process for the insulated container 1, after forming a double walled container by joining the inner and outer containers, the above-mentioned penetrating hole 7 is used as an evacuation and introduction opening for replacement and charging using a gas having low thermal conductivity, and, after the charging, the penetrating hole 7 is sealed using an adhesive agent. The diameter of this penetrating hole 7 is preferably 0.1~3.0 mm to avoid the adhesive running during the sealing process.

The example shown in FIG. 1 is an example showing an indented section 8 having a penetrating hole 7 formed at its center provided in the outer container 3; however, as an alternative, this may also be provided in the inner container 4. For the sake of production efficiency in the manufacturing process and from the point of view of appearance, it is preferable that this indented section be formed in the center of the bottom of the outer container 3.

The above-mentioned outer container 3 and inner container 4 are joined at their respective edges 11 and 12 to form a double walled container by a method such as vibration welding, spin welding, or the like. Since this joining is conducted by means of vibration welding or spin welding, the tightness of the seal of the joint between the inner and outer container is high and the joint strength is also great.

At least one type of gas having low thermal conductivity from within the group comprising xenon, krypton, and argon is enclosed in the insulating layer 6 which is formed between the outer container 3 and the inner container 4. The thermal conductivity of these gases, xenon ($k=0.52\times0^{-2} W\cdot m^{-1}\cdot K^{-1}$ at 0° C.), krypton ($k=0.87\times10^{-2} W\cdot m^{-1}\cdot K^1$ at 0° C.), and argon ($k=1.63\times10^{-2} W\sim m^{-1}\sim K^{-1}$ at 0° C.) is lower than that of air ($k=2.41\times10^{-2} W\cdot m^{-1}\cdot K^{-1}$ at 0° C.). Each of these gases can be used singly or they can be used in combinations of two or more. By means of using these gases having low thermal conductivity, it is possible to achieve an insulated container with high insulating ability.

The above-mentioned penetrating hole 7 is sealed by means of the insertion and adhesion of the sealing plate 9 in the indented section 8 of the outer container 3. Moreover, the penetrating hole 7 may be sealed with a cyanoacrylate-type adhesive agent, and then the cyanoacrylate-type adhesive agent may be applied to the sealing plate 9, and this sealing plate 9 fitted in and adhered to the indented section 8 of the outer container 3. In either situation, the sealed part of the penetrating hole 7 is protected from the external environment. In addition, since the sealing plate 9 is inserted into and adhered to the indented section 8, it is easy to determine the position for the sealing plate 9 when manufacturing the double walled container, and the sealing plate 9 does not slip from position.

With regard to the surfaces which face onto the space 5 which is formed between the inner container 4 and the outer container 3, a metallic radiation preventing material 13 is provided on at least the surface of the inner container 4, and by means of this, it is possible to suppress the radiant heat transmission of the insulated container. In addition, if radiation preventing material 13 is also provided on the inner surface of the outer container 3 as shown in FIG. 1, it is possible to further reduce radiant heat transmission.

As the above-mentioned radiation preventing material 13, one type selected from the group comprising metal plating, aluminum foil, copper foil and silver foil can be used. Metal foil, such as aluminum foil, copper foil, and silver foil, can be attached by means of an adhesive agent, two sided tape, or the like, and it can be attached inexpensively and easily. In addition, metal plating can be applied by means of electrical plating onto the surface of chemical plating. In addition to the reduction of radiant heat transmission, metal plating has the advantage of increasing the effectiveness of the gas barrier.

A contact preventing projection 14 is formed in the vicinity of the central section of the bottom on the outer surface side of the above-mentioned inner container 4.

This contact preventing projection 14 supports outer container 3 from the insulating layer 6 side during the manufacturing process of the above-mentioned insulated container 1 when the air in the space 5 is vacuum evacuated through penetrating hole 7 after the double walled container has been formed by joining inner container 4 and outer container 3. As a result, it is possible to prevent the penetrating hole 7 which is provided in the outer container 3 from becoming stopped up by the pingate trace of inner container 4 even when the inner surface of outer container 3 and outer surface of inner container 4 are elastically deformed due to the load of atmospheric pressure.

Figure 2:
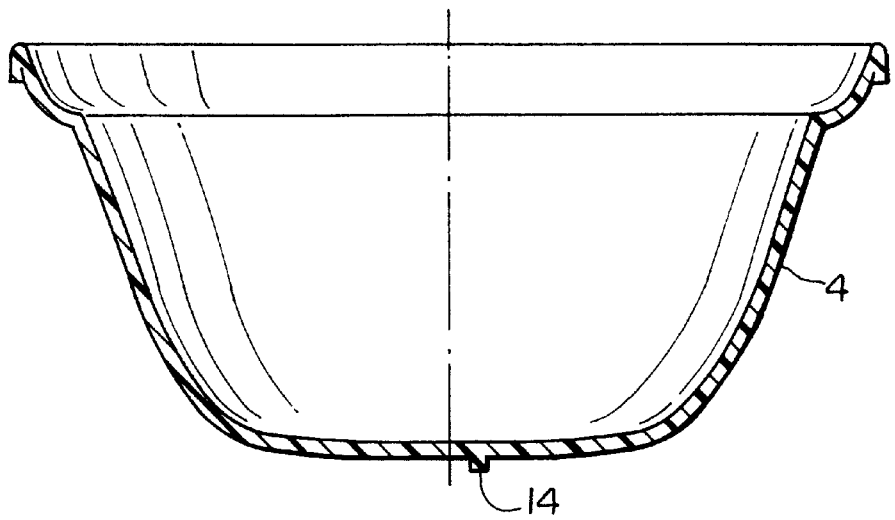
FIG. 2 is a cross-section of the inner container of the insulated synthetic resin container of the present invention.
Figure 3:
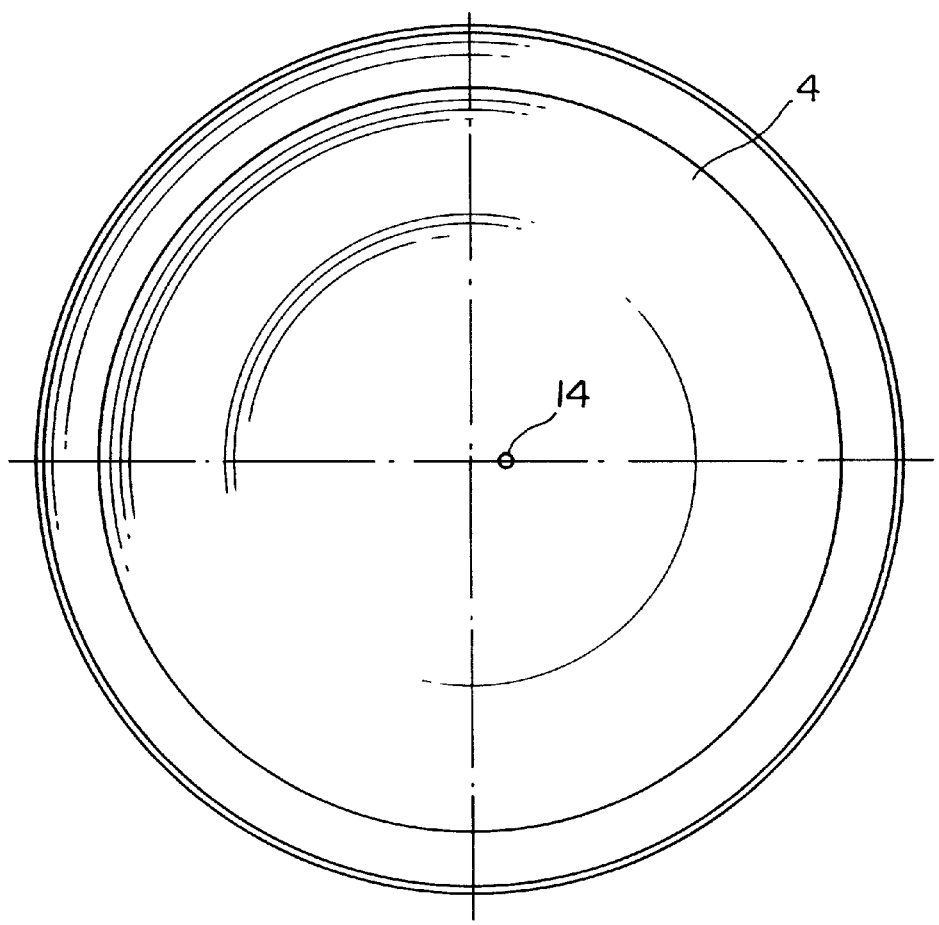
FIG. 3 is a diagram of the bottom view of the inner container of the insulated synthetic resin container of the present invention which is shown in FIG. 2.

In FIG. 2 and in FIG. 3, a side view and a bottom view of the central section of the bottom of an inner container is shown as an example in which a single cylindrically shaped contact preventing projection 14 has been formed on the side which lines the space and which is opposite to the penetrating hole 7, in other words, on the outer surface of the inner container 4. Both of these figures show the inner container 4 in a condition prior to the addition of any of the below-mentioned radiation preventing materials.

It is essential that this contact preventing projection 14 be provided at a position in which it will not block the penetrating hole 7 when the outer container 3 and the inner container 4 are elastically deformed during vacuum evacuation, and it is preferable that it be provided at a position which is as close to the penetrating hole 7 as possible. There may be a plurality of contact preventing projections 14, and when a plurality of individual contact preventing projections 14 are provided, it is possible to prevent blockage of the penetrating hole 7 even when the bottom surface is particularly wide and flat in shape.

It is preferable for at least one part of the tip of the contact preventing projection 14 to be separated from the inner surface of the outer container 3 which is opposite the contact preventing projection 14. By means of this, after vacuum evacuation, when the inner and outer containers have returned to their original shape due to the introduction of a gas having low thermal conductivity, it is possible to prevent reduction in the insulating efficiency of the insulated container 1 due to contact between the tip of contact preventing projection 14 and the inner surface of the outer container 3.

FIGS. 4A, 4B, 5A, and 5B are side views and bottom views of the center of the outer surface of the inner container 4 which show, as the shape of the contact preventing projection 14, examples of an open cylindrical shaped body positioned on the insulating layer 6 side of the outer surface of the inner container 4 and in the circular wall of this cylindrical shaped body, slits or notches which form gas passages for the purpose of vacuum evacuation or gas charging are provided.

Figure 4A:
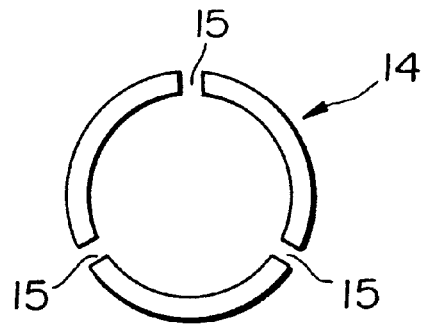
FIG. 4A and FIG. 4B show an example of a contact preventing projection which is provided in the center of the outer surface of the inner container of the insulated synthetic resin container of the present invention.
Figure 4B:
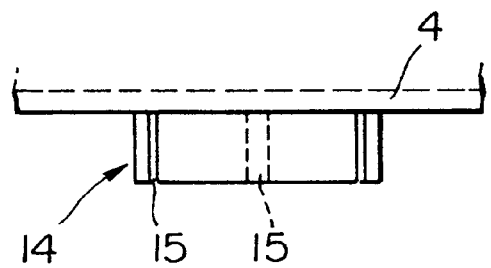

In the example shown in FIGS. 4A and 4B, the shape of the contact preventing projection 14 is made into a open cylindrical shaped body in the side of the insulating layer 6, and slits 15, 15 and 15 which have a length reaching the edge of the base of this cylindrical shaped body and a width of approximately 1~3 mm are provided in this cylindrical shaped body. The position and the number of slits 15 is not limited to those shown in this example.

Figure 5A:
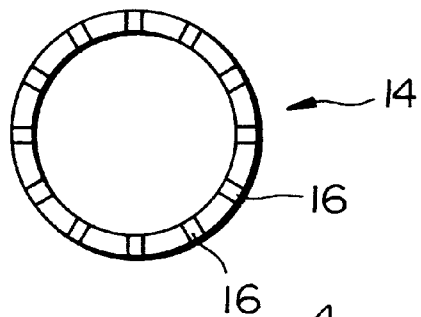
FIG. 5A and FIG. 5B show another example of a contact preventing projection which is provided in the center of the outer surface of the inner container of the insulated synthetic resin container of the present invention.
Figure 5B:
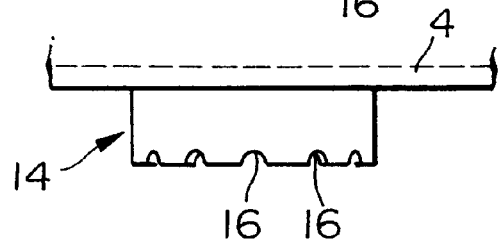

In the example shown in FIGS. 5A and 5B, the shape of the contact preventing projection 14 is made into a open cylindrical shaped body in the side of the insulating layer 6, a plurality of notches 16 . . . are provided in the rim of this cylindrical shaped body. The position and the number of notches 16 are not limited to those shown in this example.

In addition, holes having a diameter of approximately 1~3 mm can be provided in the side surface of the open cylindrically shaped contact preventing projection 14. The number and position of these holes is not particularly limited. Moreover, the shape is not limited to a cylindrical shape, and cross sections of elliptical and square shapes are also suitable and provide the same effective results in contact prevention.

Figure 6:
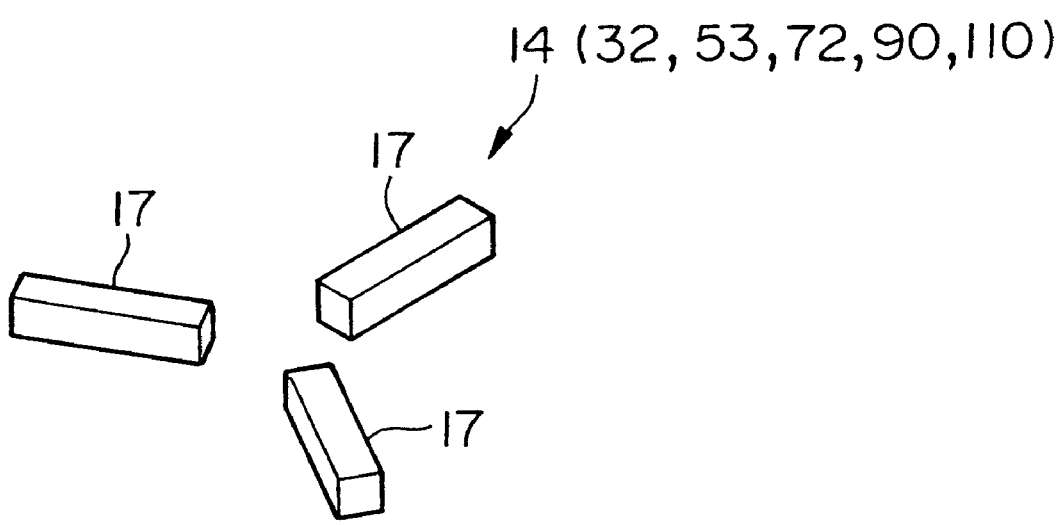
FIG. 6 is a diagram of a perspective view showing yet another example of the contact preventing projection provided in the center of the outer surface of the inner container of insulated synthetic resin container of the present invention.

In FIG. 6, an example of a contact preventing projection 14 of a different embodiment is shown. The shape of this contact preventing projection 14 is as projections 17 which extend in a radiating form as protrusions in the side of the insulating layer. These radiating projections 17 have a height which is less than the thickness of the insulating layer space 5 (6) and the number of these projections is not specifically limited. In addition the length of these radiating projections 17 is also not particularly limited as long as they fit within the space.

If contact preventing projections 14 structured as in FIGS. 4A, 4B, 5A, and 5B are provided, when conducting vacuum evacuation, the slits 15, notches 16 or holes which are formed in the contact preventing projection 14 function as gas passages and the vacuum evacuation can be conducted effectively, therefore, these conditions are preferable. In addition, when charging with a gas having low thermal conductivity, since the charging is conducted with the slits 15, notches 16 and holes functioning as gas passages, there is no delay in the charging.

In addition, if the contact preventing projection 14 comprising the projections 17 which are structured in a radiating form as in FIG. 6 are provided, when conducting vacuum evacuation, the gaps between the projections 17 which extend in a radiating condition become gas passages and the vacuum evacuation can be conducted extremely quickly. In addition, when the charging of the gas having low thermal conductivity is conducted, the gaps between the radiating projections become gas passages and the charging can be conducted extremely easily.

In addition, if these radiating projections 17 are used as the contact preventing projection 14, after the outer container 3 and the inner container 4 have been joined into a container having a unitary double walled structure by means of vibration welding or spin welding their respective edges, when this container is removed from the welding machine, it is possible to prevent the occurrence of cracks and the like, and it is possible to prevent deformation of the outer container 3 by means of the support of the above-mentioned radiating projections 17 even when the bottom of the outer container 3 is pushed by the ejection implement.

In addition, for example, when a hot drink or the like is put into an insulated container 1 obtained by means of the present invention, the gas having low thermal conductivity which has been sealed in the space 5, formed between outer container 3 and the inner container 4, expands. In consequence of this, the load bears on the bottom which is formed flat and the strength of which is weak due to the pressure load. However, by means of arranging, on the bottom, the above-mentioned radiating projections 17 of the above-mentioned FIG. 6 as the contact preventing projection 14, strength against the pressure load due to the abovementioned expansion can be obtained, and it is possible to design thin walls without needing to increase the thickness of the walls of the bottom of inner container 4 and outer container 3. As a result, it is possible to lighten the weight and to reduce costs. This type of situation is not only for the above-mentioned situation in which a hot drink is put into the insulated container, and the same type of effects are exhibited in situations such as when cleaning with hot water, disinfecting, and drying with a drier after the container has been used.

For whatever shape of contact preventing projection 14 used, since a larger surface area for the surface of the tip of the contact preventing projection 14 makes it possible for this surface to widely and uniformly support the pressure of the vacuum evacuation, a wide surface area is preferable from the point of view of preventing damage and scratching of the opposite surface. Consequently, it is preferable for the shape of the tip of the contact preventing projection to be flat or rounded.

The contact preventing projections 14 shown in FIG. 2, FIG. 3, FIGS. 4A and 4B, FIGS. 5A and 5B, and FIG. 6 are formed in the outer surface of the inner container 4 which is opposite the penetrating hole 7 and which is arranged on the other side of space 5, but as an alternative, it is also possible to provide contact preventing projection 14 with the same structure on the same side as the penetrating hole 7 on the inner surface (the insulating layer 6 side) of the outer container 3. Furthermore, it is also possible to provide the contact preventing projection 14 in both of the above-mentioned surfaces of the inner and outer containers 4 and 3.

When the contact preventing projection 14 is formed in both of the inner container 4 and the outer container 3, it is preferable for the length of the contact preventing projection 14 to be made the same. In addition, when the contact preventing projection 14 is provided on both the outer container 3 and the inner container 4 as the open cylindrical shaped body shown in FIGS. 4A and 4B, or in FIGS. 5A and 5B, it is preferable that the pair of contact preventing projections be formed in a concentric circular shape having the penetrating hole 7 as their center. In addition, when the radiating projections 17 shown in FIG. 6 are provided in both the outer container 3 and the inner container 4 as the contact preventing projection 14, it is preferable that the radiating projections 17 of the outer container 3 and the radiating projections 17 of inner container 4 be arranged so that they do not come into contact with each other during the vacuum evacuation.

Next, the insulated lid 2 shown in FIG. 1 will be explained. This insulated lid 2 has a hat shape and comprises a top surface wall 21 and a bottom surface wall 22 which are injection molded from a resin such as a mixed resin of polycarbonate and polyester. In addition, the space 23 between this top surface wall and bottom surface wall forms an insulating layer 24. The top surface wall 21 and the bottom surface wall 22 are injection molded by means of the pingate method.

In the center of the bottom surface wall 22 a penetrating hole 25 is formed. Surrounding this penetrating hole 25 and with the penetrating hole 25 at its center, a concentric circle shaped indented section 26 is formed in the lower surface side of the bottom surface wall 22. A sealing plate 27 can be fitted into this indented section 26. In addition, a concentric circle shaped projecting section 28 is formed, with the penetrating hole 25 at its center, in the upper surface side (the insulating layer 24 side) of the bottom surface wall 22 and which corresponds to the indented section 26, such that the thickness of the vicinity of the center of the bottom of the bottom surface wall 22 is the same as other parts of the bottom of the bottom surface wall 22. When the wall thickness of the central section of bottom surface wall 22 is molded in such a way that it is approximately identical in thickness to other sections, it is possible to avoid reducing the strength of the central section of bottom surface wall 22, and this is particularly advantageous for insulated lids manufactured from synthetic resin for which the thickness of the walls must be made thin for the purpose of making the lids light weight.

The above-mentioned indented section 26 is for the purpose of inserting and adhering sealing plate 27, and the depth of the indented section 26 is formed such that it is equal to the thickness of the sealing plate 27 which is formed from the same resin as the top surface wall 21 and bottom surface wall 22. By means of this type of structure, after the insulated lid 2 is assembled, the bottom part of the insulated lid 2 can be made smooth, the appearance and handling are superior, and cleaning is simple.

During the manufacturing process for the insulated lid 2, after forming a double wall structured lid by joining the top and bottom surface walls, the above-mentioned penetrating hole 25 is used as an evacuation and introduction opening for replacement and charging using a gas having low thermal conductivity, and, after the charging, the penetrating hole 25 is sealed using an adhesive agent. The diameter of this penetrating hole 25 is preferably 0.1~3.0 mm to avoid the adhesive running during the sealing process.

The example shown in FIG. 1 is an example showing an indented section 26 having a penetrating hole 25 formed at its center provided in the bottom surface wall 22; however, as an alternative, this may also be provided in the top surface wall 21. However, for the sake of the manufacturing process and from the point of view of appearance, this indented section 26 is usually formed in the center of the bottom of the bottom surface wall 22.

In the insulated lid 2, the edges 29 and 30 of the top surface wall 21 and the bottom surface wall 22 are joined into a single body, separated by a space 23 in between the top surface wall 21 and the bottom surface wall 22, to form a double walled lid by a method such as vibration welding, spin welding, or the like. Since this joining is conducted by means of vibration welding or spin welding, the tightness of the seal of the joint is high and the joint strength is also great.

At least one type of gas having low thermal conductivity from within the group comprising xenon, krypton, and argon is enclosed in the insulating layer 24 which is formed between the top surface wall 21 and the bottom surface wall 22. The thermal conductivities of these gases are lower than that of air. Each of these gases can be used singly or they can be used in combinations of two or more. By means of using these gases having low thermal conductivity, it is possible to achieve an insulated lid 2 with high insulating ability.

The above-mentioned penetrating hole 25 is sealed by means of the insertion and adhesion of a sealing plate 27 in the indented section 26 of the bottom surface wall 22. Moreover, the penetrating hole 25 may be sealed with a cyanoacrylate-type adhesive agent, and then the cyanoacrylate-type adhesive agent may be applied to the sealing plate 27, and this sealing plate 27 fitted in and adhered to the indented section 26 of the bottom surface wall 22. In either situation, the sealed part of the penetrating hole 25 is protected from the external environment. In addition, since the sealing plate 27 is inserted into and adhered to the indented section 26, it is easy to determine the position for the sealing plate 27 when manufacturing the insulated lid 2, and the sealing plate 27 does not slip from position.

With regard to the surfaces which face onto the space 23 which is formed between the top surface wall 21 and the bottom surface wall 22, a metallic radiation preventing material 31 is provided on at least the surface of the bottom surface wall 22, and by means of this, it is possible to suppress the radiant heat transmission of the insulated lid 2. In addition, if radiation preventing material 31 is also provided on the inner surface of the top surface wall 21 as shown in FIG. 1, it is possible to further reduce radiant heat transmission.

As the above-mentioned radiation preventing material 31, one type selected from the group comprising metal plating, aluminum foil, copper foil and silver foil can be used. Metal foil, such as aluminum foil, copper foil, and silver foil, can be attached by means of an adhesive agent, two sided tape, or the like, and it can be attached inexpensively and easily. In addition, metal plating can be applied by means of electrical plating onto the surface of chemical plating. In addition to the reduction of radiant heat transmission, metal plating has the advantage of increasing the effectiveness of the gas barrier.

A contact preventing projection 32 is formed on the lower surface of the abovementioned top surface wall 21.

This contact preventing projection 32 supports bottom surface wall 22 from the insulating layer 24 side during the manufacturing process of the above-mentioned insulated lid 2 when the air in the space 23 is vacuum evacuated through penetrating hole 25 after the double walled lid has been formed by joining top surface wall 21 and bottom surface wall 22. As a result, it is possible to prevent the gas passages from becoming blocked because there is no contact between the lower surface of the handle section of the top surface wall 21 with the indented section of the bottom surface wall 22 even when the lower surface of top surface wall 21 and the upper surface of bottom surface wall 22 are elastically deformed due to the load of atmospheric pressure.

Figure 7:
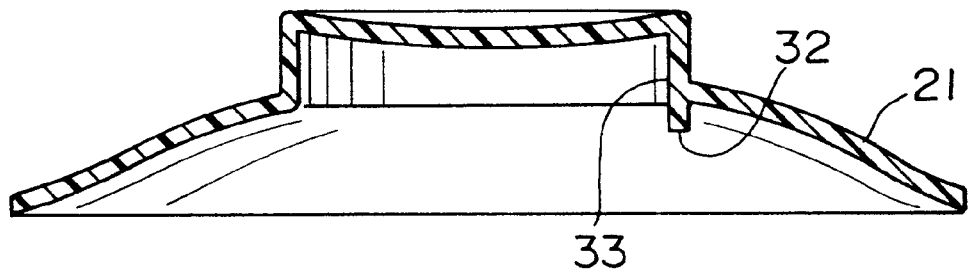
FIG. 7 is a cross-section of the top surface wall of the insulated synthetic resin lid of the present invention.
Figure 8:
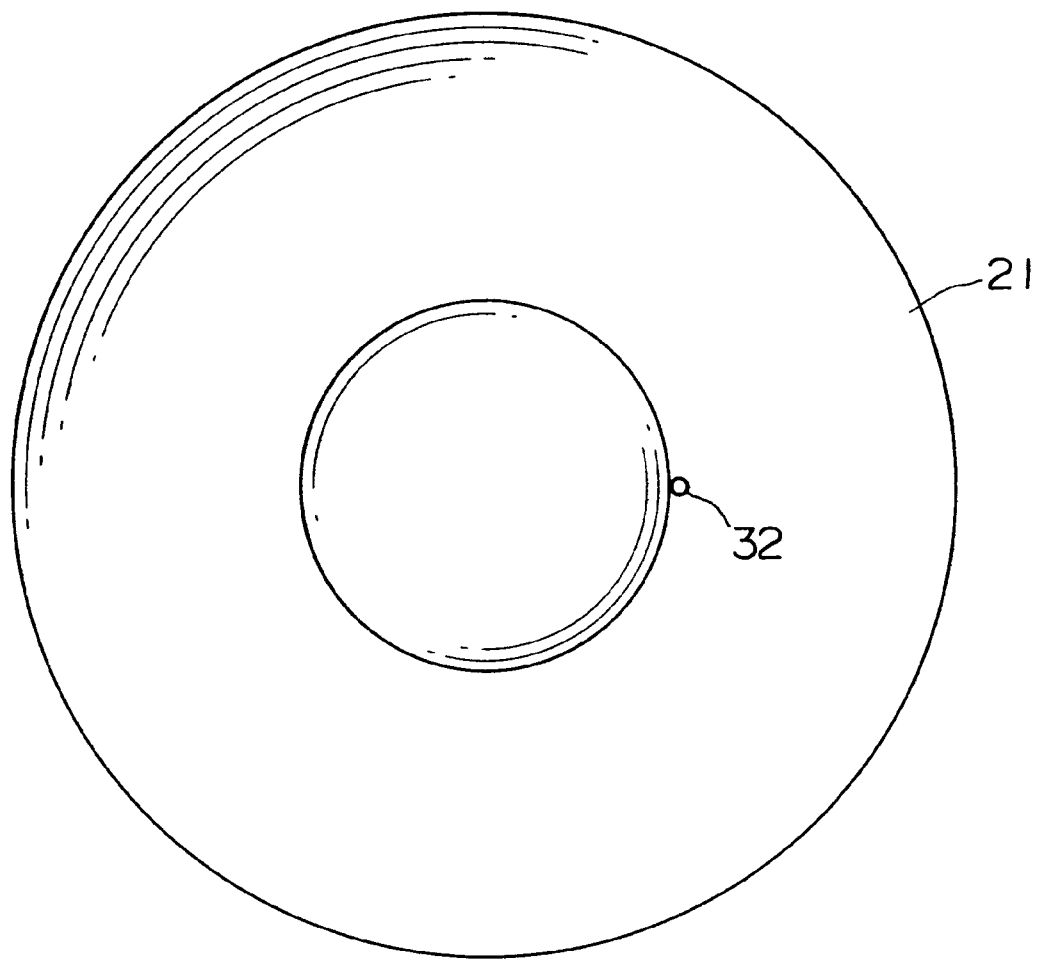
FIG. 8 is a diagram of the bottom view of the top surface wall of the insulated synthetic resin lid of the present invention shown in FIG. 7.

FIG. 7 and FIG. 8 show an example in which a cylindrically shaped contact preventing projection 32 extends, on the insulating layer 24 side, from one place on the inner wall 33 of the handle section of the top surface wall 21. Both of these figures show the top surface wall 21 in a condition prior to the addition of any of the below-mentioned radiation preventing materials. In addition, a plurality of cylindrically shaped contact preventing projections 32 may be individually provided.

It is preferable for at least one part of the tip of the contact preventing projection 32 to be separated from the inner surface of the bottom surface wall 22 which is opposite the contact preventing projection 32. By means of this, after vacuum evacuation, when the top and bottom surface walls 21 and 22 have returned to their original shape due to the introduction of a gas having low thermal conductivity, it is possible to prevent reduction in the insulating efficiency of the insulated lid 2 due to contact between the tip of contact preventing projection 32 and the upper surface of bottom surface wall 22.

FIGS. 9A, 9B, 10A, and 10B are side views and bottom views of the center of the top surface wall 21 which show, as the shape of the contact preventing projection 32, examples of an open cylindrical shaped body positioned on the insulating layer 24 side of the center of top surface wall 21 and in the circular wall of this cylindrical shaped body, slits or notches which form gas passages for the purpose of vacuum evacuation or gas charging are provided.

In the example shown in FIGS. 9A and 9B, the shape of the contact preventing projection 32 is made by extending the inner wall 33 of the handle section inward (the insulating layer 24 side) and forming an open cylindrical shaped body in the side of the insulating layer 24. Slits 34, 34 and 34 which have a length reaching to the edge of the base of this cylindrical shaped body and a width of approximately 1~3 mm are provided in this cylindrical shaped body. The position and the number of slits 34 is not limited to those shown in this example.

In the example shown in FIGS. 10A and 10B, the shape of the contact preventing projection 32 is made by extending the inner wall 33 of the handle section inward (the insulating layer 24 side) and forming an open cylindrical shaped body in the side of the insulating layer 24. A plurality of notches 35 . . . are provided in the rim of this cylindrical shaped body. The position and the number of notches 35 are not limited to those shown in this example.

In addition, holes having a diameter of approximately 1~3 mm can be provided in the side surface of the open cylindrically shaped contact preventing projection 32. The number and position of these holes is not particularly limited. Moreover, the shape is not limited to a cylindrical shape, and cross-sections of elliptical and square shapes are also suitable and provide the same effective results in contact prevention.

Figure 11A:
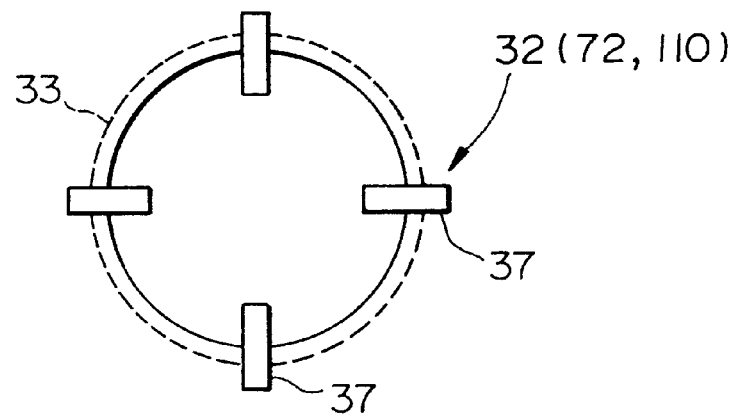
FIG. 11A and FIG. 11B show yet another example of a contact preventing projection which is provided in the lower surface of the top surface wall of the insulated synthetic resin lid of the present invention.
Figure 11B:
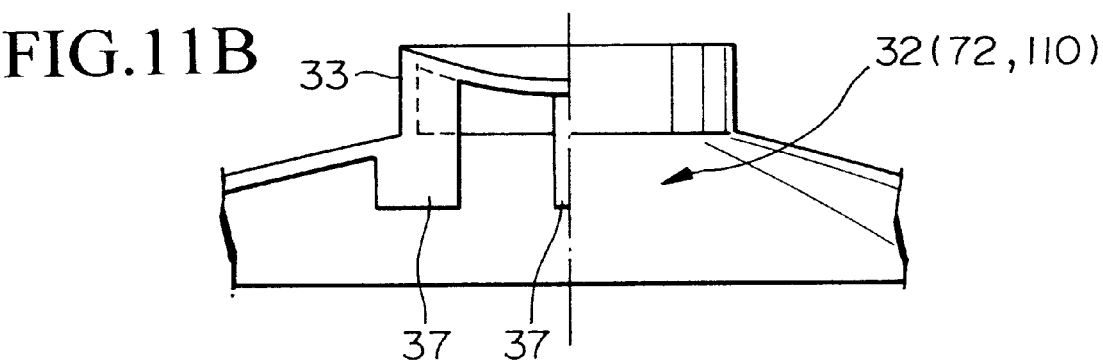

In FIGS. 11A and 11B, a different example of the shape of contact preventing projection 32 is shown, in which projections 37 which are projecting protrusions which extend radially are arranged in the side of the insulating layer 24. The number of these radiating projections 37 is not limited by what is shown in the figures. In addition, the length of these radiating projections 37 is also not particularly limited.

If contact preventing projection 32 structured as in FIGS. 9A, 9B, 10A, and 10B are provided, when conducting vacuum evacuation, the slits 34, notches 35 or holes which are formed in the contact preventing projection 32 function as gas passages and the vacuum evacuation can be conducted effectively, therefore, these conditions are preferable. In addition, when charging with a gas having low thermal conductivity, since the charging is conducted with the slits 34, notches 35 and holes functioning as gas passages, there is no delay to the charging.

In addition, if the contact preventing projection 32 comprising the projections 37 which are structured in a radiating form as in FIGS. 11A and 11B are provided, when conducting vacuum evacuation, the gaps between the projections 37 which extend in a radiating condition become gas passages and the vacuum evacuation can be conducted extremely quickly. In addition, when the charging of the gas having low thermal conductivity is conducted, the gaps between the radiating projections 37 become gas passages and the charging can be conducted extremely easily.

In addition, if these radiating projections 37 are used as the contact preventing projection 32, after the top surface wall 21 and bottom surface wall 22 have been joined into a single body as a lid having a unitary double walled structure by means of vibration welding or spin welding their respective edges, when this lid is removed from the welding machine, it is possible to prevent the occurrence of cracks and the like, and it is possible to prevent deformation of the top surface wall 21 by means of the support of the abovementioned radiating projections 17 even when the bottom of the top surface wall 21 is pushed by the ejection implement.

In addition, for example, when a hot drink or the like is put into an insulated container 1 obtained by means of the present invention, the situation for the insulated lid 2 is such that the gas having low thermal conductivity which has been sealed in the space 23, formed between top surface wall 21 and the bottom surface wall 22, expands. In consequence of this, the load bears on the generally central sections of top surface wall 21 and bottom surface wall 22 which are formed flat and the strength of which is weak due to the pressure load. However, by means of arranging the abovementioned radiating projections 37 of the abovementioned FIGS. 11A and 11B as the contact preventing projection 32, strength against the pressure load due to the abovementioned expansion can be obtained. As a result, it is possible to design thin walls without needing to increase the thickness of the walls of the generally central sections of the top surface wall 21 and bottom surface wall 22. As a result, it is possible to lighten the weight of the insulated lid and to reduce costs. This type of situation is not only for the above-mentioned situation in which a hot drink is put into the insulated container, and the same type of effects are exhibited in situations such as when cleaning with hot water, disinfecting, and drying with a drier after the container has been used.

For whatever shape of contact preventing projection 32 used, since a larger surface area for the surface of the tip of the contact preventing projection 32 makes it possible for this surface to widely and uniformly support the pressure of the vacuum evacuation, a wide surface area is preferable from the point of view of preventing damage and scratching of the opposite surface. Consequently, it is preferable for the shape of the tip of the contact preventing projection to be, for example, flat or rounded.

The contact preventing projections 32 shown in FIGS. 9A and 9B, FIGS. 10A and 10B, and FIGS. 11A and 11B are formed on the lower surface of the top surface wall 21 which is opposite the penetrating hole 25 and which is arranged on the other side of the space 23, but as an alternative, it is also possible to provide contact preventing projection 32 with the same structure on the same side as the penetrating hole 25 on the top surface (the insulating layer 24 side) of bottom surface wall 22. Furthermore, it is also possible to provide the contact preventing projection 32 on both of the abovementioned surfaces of the top and bottom surface walls 21 and 22.

When the contact preventing projection 32 is formed in both of the top surface wall 21 and bottom surface wall 22, it is preferable for the length of the contact preventing projection 32 to be made the same and, in particular, when the contact preventing projection 32 is provided on both the top surface wall 21 and the bottom surface wall 22 as the cylindrical shaped body shown in FIGS. 9A and 9B, or in FIGS. 10A and 10B, it is preferable that the pair of contact preventing projections be formed in a concentric circular shape having the penetrating hole 25 as their center. In addition, when the radiating projections 37 as shown in FIGS. 11A and 11B are provided in both the top surface wall 21 and the bottom surface wall 22 as the contact preventing projection 32, it is preferable that the radiating projections 37 of the top surface wall 21 and the radiating projections 37 of bottom surface wall 22 be arranged so that they do not come into contact with each other during the vacuum evacuation.

Figure 12:
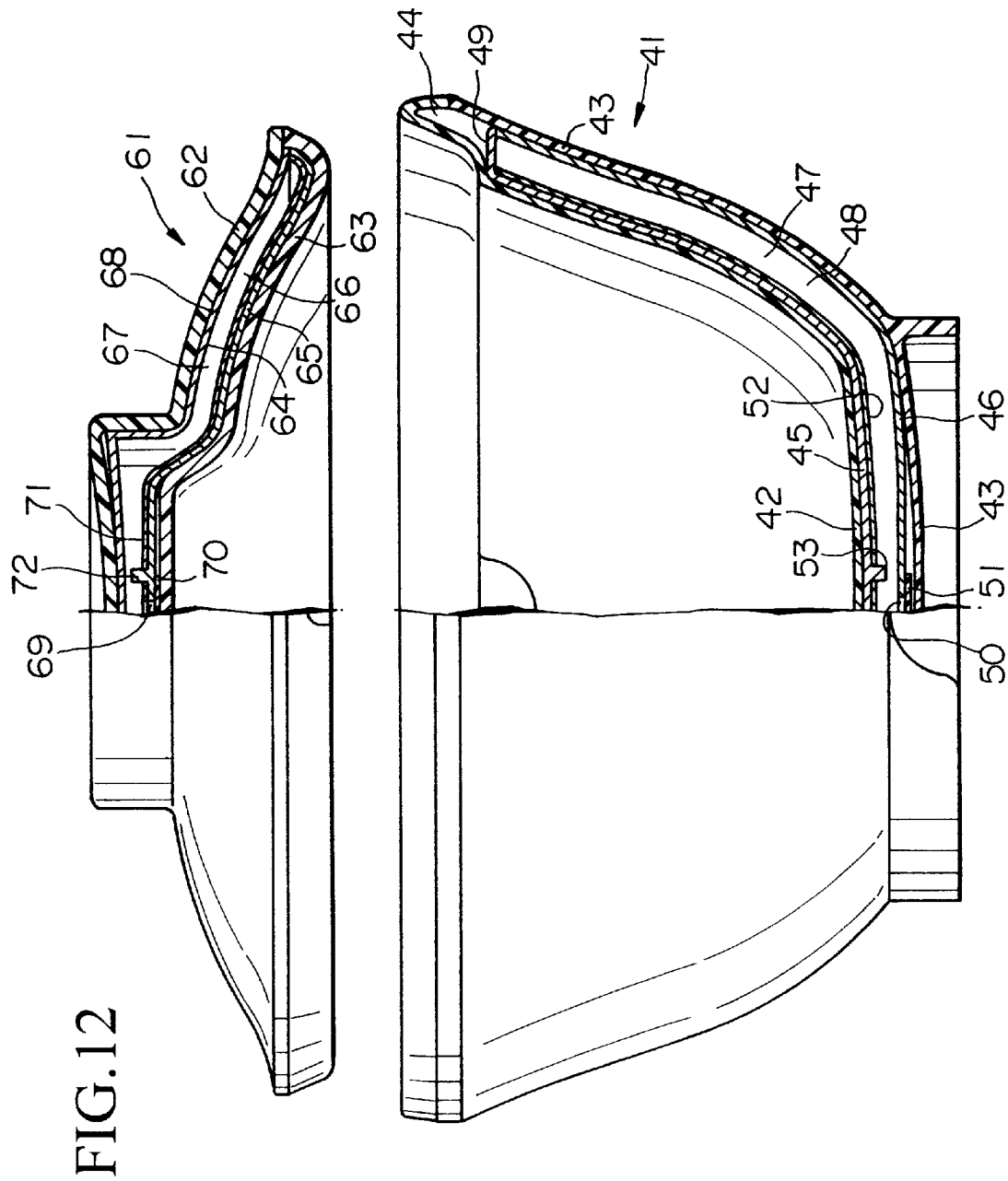
FIG. 12 is a partial cross-section showing another example of the insulated synthetic resin lid and insulated synthetic resin container of the present invention.
Figure 13:
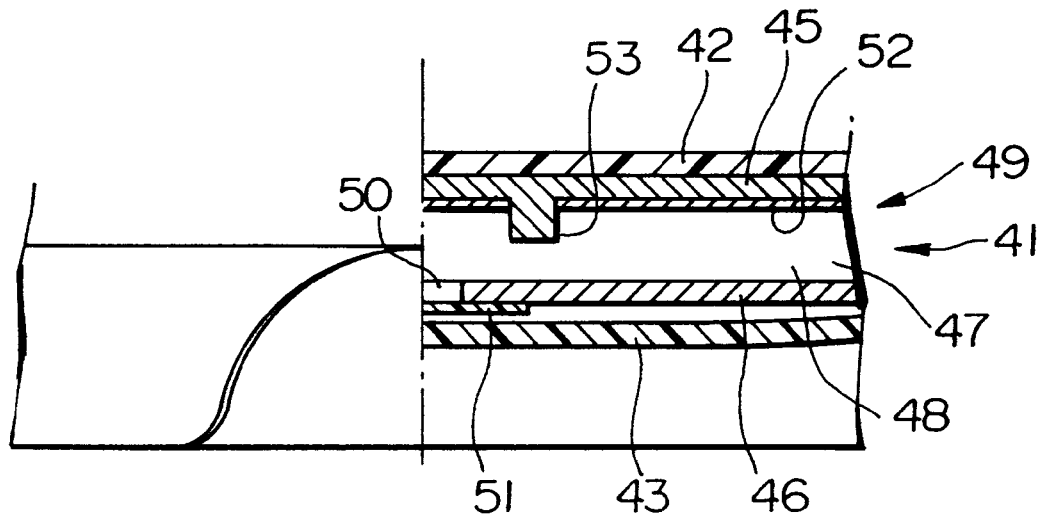
FIG. 13 is an enlarged partial cross-section of the central section of the bottom of the insulated synthetic resin container of the present invention shown in FIG. 12.
Figure 14:
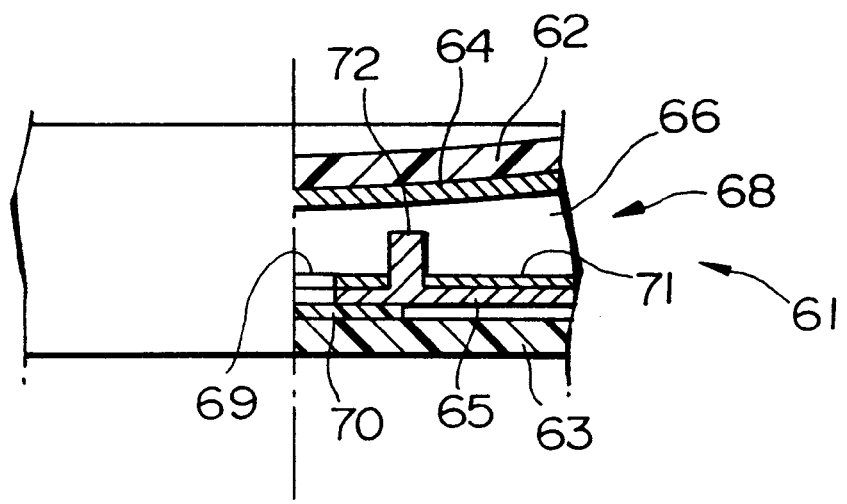
FIG. 14 is an enlarged partial cross-section of the central section of the upper surface of the insulated synthetic resin lid of the present invention shown in FIG. 12.

FIGS. 12, 13, and 14 show a different embodiment of the insulated container and the insulated lid of the present invention.

This insulated container 41 has a Chinese bowl shape or a bowl shape and has a double walled container comprising an inner container 42, an outer container 43 which are injection molded using a resin such as polypropylene, and a space 44 between the inner container 42 and the outer container 43. An insulation layer body 49 is arranged within this space 44. This insulation layer body 49 is manufactured from a synthetic resin; has a double walled structure which comprises an inner wall 45 and an outer wall 46 which are injection molded using, preferably, a resin which enhances the properties of the gas barrier; and forms an insulating layer 48 in a space 47 formed between the above-mentioned inner wall 45 and outer wall 46. The inner container 42, the outer container 43, the inner wall 45 and the outer wall 46 are injection molded by means of a pingate method.

The above-mentioned synthetic resin material which enhances gas barrier properties (hereinafter referred to as "superior gas barrier property resin") is, specifically, a synthetic resin material for which the gas permeability (ASTM D 1434-58) for a film is less than $1.0 \text{ g/m}^2/24\text{hr/atm}$ for $O_2$, $N_2$ and $CO_2$. For example, this resin may be any resin selected from among polyesters such as polyethylene terephthalate, polybutylene terephthalate, and polyethylene naphthalate; polyamide; ethylene vinyl alcohol; polyvinylidene chloride; polyacrylonitrile; polyvinyl alcohol; and the like.

In the center of the bottom of the outer wall 46, a penetrating hole 50 is formed. During the manufacturing process for the insulation layer body 49, after joining the inner and outer walls 45 and 46, the above-mentioned penetrating hole 50 is used as an evacuation and introduction opening for exchange and charging using a gas having low thermal conductivity, and, after the charging, the penetrating hole 50 is sealed using an adhesive agent. The diameter of this penetrating hole 50 is preferably 0.1~3.0 mm to avoid the adhesive running during the sealing process.

The above-mentioned penetrating hole 50 is sealed by means of the insertion and adhesion of the sealing plate 51. In addition, the penetrating hole 50 may be sealed with a cyanoacrylate-type adhesive agent, and then cyanoacrylate-type adhesive agent may be applied to the sealing plate 51 which is then adhered over the penetrating hole 50.

FIG. 13 shows an example in which the penetrating hole 50 is provided in the outer wall 46; however, as an alternative, the penetrating hole 50 can be provided in the inner wall 45. However, usually the penetrating hole 50 is formed in the center of the bottom of the outer wall 46.

The insulation layer body 49 is formed by joining into a single body the abovementioned outer wall 46 and the above-mentioned inner wall 45 separated by a space 47. The above-mentioned outer wall 46 and inner wall 45 are joined at their respective edges to form a double walled structure by a method such as vibration welding, spin welding, or the like. Since this joining is conducted by means of vibration welding or spin welding, the tightness of the seal of the joint of the inner wall and the outer wall is high and the joint strength is great.

At least one type of gas having low thermal conductivity from within the group comprising xenon, krypton, and argon is enclosed in the insulating layer 48 which is formed between the outer wall 46 and the inner wall 45. The thermal conductivities of these gases are lower than that of air. These gases can be used singly or they can be used in combinations of two or more. By means of using these gases having low thermal conductivity, it is possible to achieve an insulated container with high insulating ability.

With regard to the surfaces which face onto the space 47 which is formed between the inner wall 45 and the outer wall 46, a metallic radiation preventing material 52 is provided on at least the surface of the inner wall 45, and by means of this, it is possible to suppress the radiant heat transmission of the insulated container 41. In addition, if radiation preventing material 52 is also provided on the inner surface of the outer wall 46 (not shown in the figure), it is possible to further reduce radiant heat transmission.

As the above-mentioned radiation preventing material 52, one type selected from the group comprising metal plating, aluminum foil, copper foil and silver foil can be used. Metal foil, such as aluminum foil, copper foil, and silver foil, can be attached by means of an adhesive agent, two sided tape, or the like, and it can be attached inexpensively and easily. In addition, metal plating can be applied by means of electrical plating onto the surface of chemical plating. In addition to the reduction of radiant heat transmission, metal plating has the advantage of increasing the effectiveness of the gas barrier.

A contact preventing projection 53 is formed in the vicinity of the center of the bottom of the outer surface side of the above-mentioned inner wall 45.

This contact preventing projection 53 supports outer wall 46 from the insulating layer side during the manufacturing process of the above-mentioned insulation layer body 49 when the air in the space 47 is vacuum evacuated through penetrating hole 50 after the double walled structure has been formed by joining inner wall 45 and outer wall 46. As a result, it is possible to prevent the penetrating hole 50 of outer wall 46 from becoming stopped up by the pingate trace of inner wall 45 even when the inner surface of outer wall 46 and the outer surface of inner wall 45 are elastically deformed due to the load of atmospheric pressure.

FIG. 12 and FIG. 13 show an example in which a single cylindrically shaped contact preventing projection 53 has been formed on the outer surface of the inner wall 45 which encloses the space 47 and which is opposite to the penetrating hole 50. It is essential that this contact preventing projection 53 be provided at a position in which it will not block the penetrating hole 50 when the outer wall 46 and the inner wall 45 are elastically deformed during the vacuum evacuation, and it is preferable that it be provided at a position which is as close to the penetrating hole 50 as possible. The number of contact preventing projections 53 may also be plural, and when a plurality of individual contact preventing projections 53 are provided, it is possible to prevent blockage of the penetrating hole 50 even when the bottom surface is particularly wide and flat in shape.

It is preferable for at least one part of the tip of the contact preventing projection 53 to be separated from the inner surface of the outer wall 46 which is opposite the contact preventing projection 53. By means of this, after vacuum evacuation, when the inner and outer walls 45 and 46 have returned to their original shape due to the introduction of a gas having low thermal conductivity, it is possible to prevent reduction in the insulating efficiency of the insulation layer body 49 due to contact between the tip of contact preventing projection 53 and the inner surface of outer wall 46.

FIGS. 15A, 15B, 16A, and 16B are side views and bottom views of the center of the outer surface of the inner wall 45 which show, as the shape of the contact preventing projection 53, examples of an open cylindrical shaped body positioned on the insulating layer 48 side of the outer surface of the inner wall 45 and, in the circular wall of this cylindrical shaped body, slits or notches which form gas passages for the purpose of vacuum evacuation or gas charging are provided.

Figure 15A:
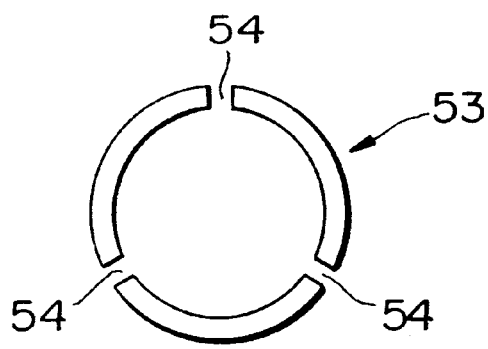
FIG. 15A and FIG. 15B show an example of a contact preventing projection which is provided in the center of the outer surface of the inner wall of the insulated synthetic resin container of the present invention.
Figure 15B:
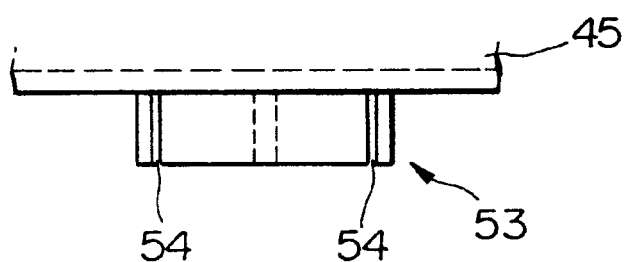

In the example shown in FIGS. 15A and 15B, the shape of the contact preventing projection 53 is made into a open cylindrical shaped body on the insulating layer 48 side, and slits 54, 54 and 54 which have a length reaching the edge of the base of this cylindrical shaped body and a width of approximately 1~3 mm are provided in this cylindrical shaped body. The position and the number of slits 54 is not limited to those shown in this example.

Figure 16A:
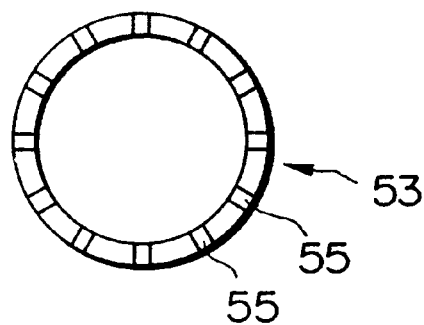
FIG. 16A and FIG. 16B show another example of a contact preventing projection which is provided in the center of the outer surface of the inner wall of the insulated synthetic resin container of the present invention.
Figure 16B:
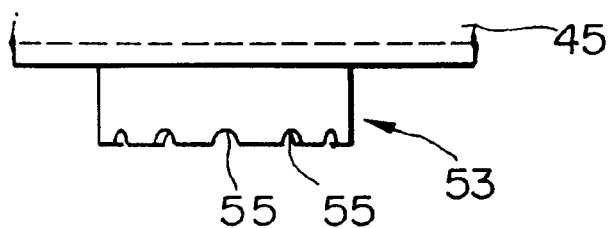

In the example shown in FIGS. 16A and 16B, the shape of the contact preventing projection 53 is made into an open cylindrical shaped body in the insulating layer 48 side, a plurality of notches 55 . . . are provided in the open rim of this cylindrical shaped body. The position and the number of notches 55 are not limited to those shown in this example.

In addition, holes (not shown in the figures) having a diameter of approximately 1~3 mm can be provided in the side surface of the open cylindrically shaped contact preventing projection 53. The number and position of these holes is not particularly limited. Moreover, the shape is not limited to a cylindrical shape, and cross sections of elliptical and square shapes are also suitable and provide the same effective results in contact prevention.

Furthermore, the radiating projections 17 shown in FIG. 6 can be used as the contact preventing projection 53. In this situation, the number of projections 17 extending in a radiating form is not limited to a specific number. In addition, the length of these radiating projections 17 is also not limited to a specific dimension.

If contact preventing projection 53 structured as in FIGS. 15A, 15B, 16A, and 16B are provided, when conducting vacuum evacuation, the slits 54, notches 55 or holes which are formed in the contact preventing projection 53 function as gas passages and the vacuum evacuation can be conducted effectively, therefore, these conditions are preferable. When charging with a gas having low thermal conductivity, since the charging is conducted with the slits 54, notches 55 and holes functioning as gas passages, there is no delay in the charging.

In addition, if the radiating projections 17 structured as shown in FIG. 6 are provided as the contact preventing projection 53, when conducting vacuum evacuation, the gaps between the projections 17 which extend in a radiating condition become gas passages and the vacuum evacuation can be conducted extremely quickly. In addition, when the charging of the gas having low thermal conductivity is conducted, the gaps between the radiating projections 17 become gas passages and the charging can be conducted extremely easily.

In addition, if these radiating projections 17 are used as the contact preventing projection 53, after the outer wall 46 and the inner wall 45 have been joined into a single body as an insulation layer body 49 having a double walled structure by means of vibration welding or spin welding their respective edges, when this container is removed from the welding machine, it is possible to prevent the occurrence of cracks and the like, and it is possible to prevent deformation of the outer wall 46 by means of the support of the above-mentioned radiating projections 17 even when the bottom of the outer wall 46 is pushed by the ejection implement.

In addition, for example, when a hot drink or the like is put into an insulated container 41 obtained by means of the present invention, the gas having low thermal conductivity which has been sealed in the space 47, formed between outer wall 46 and the inner wall 45, expands. In consequence of this, the load bears on the bottom of the outer wall 46 or the inner wall 45 which are formed flat and the strength of which is weak due to the pressure load. However, by means of arranging, on the bottom, the above-mentioned radiating projections 17 of the above-mentioned FIG. 6 as the contact preventing projection 53, strength against the pressure load due to the above-mentioned expansion can be obtained, and it is possible to design thin walls without needing to increase the thickness of the walls of the bottom of inner wall 45 and outer wall 46. As a result, it is possible to lighten the weight of the insulated container and to reduce costs. This type of situation is not only for the above-mentioned situation in which a hot drink is put into the insulated container, and the same type of effects are exhibited in situations such as when cleaning with hot water, disinfecting, and drying with a drier after the container has been used.

For whatever shape of contact preventing projection 53 used, since a larger surface area for the surface of the tip of the contact preventing projection 53 makes it possible for this surface to widely and uniformly support the pressure of the vacuum evacuation, a wide surface area is preferable from the point of view of preventing damage and scratching of the opposite surface. Consequently, it is preferable for the shape of the tip of the contact preventing projection 53 to be flat or rounded.

The contact preventing projections 53 shown in FIG. 12, FIG. 13, FIG. 15A, FIG. 15B, FIG. 16A and FIG. 16B and the radiating projection 17 shown in FIG. 6 which are used as the contact preventing projection 53 are shown, as examples, formed in the outer surface of the inner wall 45 which is opposite the penetrating hole 50 and which is arranged on the other side of the space 47. However, as an alternative, it is also possible to provide contact preventing projection 53 with the same structure on the same side as the penetrating hole 50 on the inner surface (the insulating layer 48 side) of outer wall 46. Furthermore, it is also possible to provide the contact preventing projection 53 in both of the above-mentioned surfaces of the inner and outer walls 45 and 46.

When the contact preventing projection 53 is formed in both of the inner wall 45 and the outer wall 46, it is preferable for the length of the contact preventing projection 53 to be made the same. In addition, when the contact preventing projection 53 is provided on both the outer wall 46 and the inner wall 45 as the cylindrical shaped body shown in FIGS. 15A and 15B, or in FIGS. 16A and 16B, it is preferable that the pair of contact preventing projections 53 be formed in a concentric circular shape having the penetrating hole 50 as their center.

When the radiating projections 17 shown in FIG. 6 are provided in both the outer wall 46 and the inner wall 45 as the contact preventing projection 53, it is preferable that the radiating projections 17 of the outer wall 46 and the radiating projections 17 of inner wall 45 be arranged so that they do not come into contact with each other during the vacuum evacuation.

The insulation layer body 49 of the above-mentioned structure is installed in the space 44 between the outer container 43 and the inner container 42, and the above-mentioned outer container 43 and inner container 42 are joined so as to form a double walled container by means of a method such as vibration welding or spin welding their respective edges. Since this joining is conducted by means of vibration welding or spin welding, the tightness of the seal of the joint between the inner and outer containers 42 and 43 is high and the joint strength is also great.

The opening of the insulated container 41 of the above-mentioned structure is covered by insulated lid 61 in a removable manner.

This insulated lid 61 is a double walled lid comprising a top surface wall 62 and a bottom surface wall 63 which are injection molded using a resin such as polypropylene, and a space between this top surface wall 62 and bottom surface wall 63. A lid insulation layer body 68 is maintained within this space. This lid insulation layer body 68 is manufactured from a synthetic resin; has a double walled structure which comprises an upper wall 64 and a lower wall 65 which are injection molded using superior gas barrier property resin; and forms an insulating layer 67 in a space 66 formed between the above-mentioned upper wall 64 and lower wall 65. The top surface wall 62, the bottom surface wall 63, the upper wall 64 and the lower wall 65 are injection molded by means of a pingate method.

In the center of the bottom of the lower wall 65, as shown in FIG. 14, a penetrating hole 69 is formed. During the manufacturing process for the insulation layer body 68 for the lid, after joining the upper wall 64 and lower wall 65, this penetrating hole 69 is used for the replacement and charging of a gas having low thermal conductivity. The diameter of this penetrating hole 69 is preferably 0.1~3.0 mm to avoid the adhesive running during the sealing process.

The above-mentioned penetrating hole 69 is sealed from the lower surface of the lower wall 65 by means of the insertion and adhesion of the sealing plate 70. In addition, the penetrating hole 69 may be sealed with a cyanoacrylate-type adhesive agent, and then cyanoacrylate-type adhesive agent may be applied to the sealing plate 70 which is then adhered over the penetrating hole 69. In either situation, the sealed part of the penetrating hole 69 is protected from the external environment.

FIG. 12 and FIG. 14 show an example in which the penetrating hole 69 is provided in the lower wall 65; however, as an alternative, the penetrating hole 69 can be provided in the upper wall 64.

The above-mentioned lid insulation layer body 68 is separated by space 66. The above-mentioned upper wall 64 and lower wall 65 are joined at their respective edges to form a double walled structure by a method such as vibration welding, spin welding, or the like. Since this joining is conducted by means of vibration welding or spin welding, the tightness of the seal of the joint of the upper wall 64 and the lower wall 65 is high and the joint strength is also great.

At least one type of gas having low thermal conductivity from within the group comprising xenon, krypton, and argon is enclosed in the insulating layer 67 which is formed between the upper wall 64 and the lower wall 65. The thermal conductivities of these gases are lower than that of air. These gases can be used singly or they can be used in combinations of two or more. By means of using these gases having low thermal conductivity, it is possible to achieve an insulated lid 61 with high insulating ability.

With regard to the surfaces which face onto the space 66 which is formed between the upper wall 64 and the lower wall 65, a metallic radiation preventing material 71 is provided on at least the upper surface of the lower wall 65, and by means of this, it is possible to suppress the radiant heat transmission of the insulated lid 61. In addition, if radiation preventing material 71 is also provided on the lower surface of the upper wall 64, it is possible to further reduce radiant heat transmission.

As the above-mentioned radiation preventing material 71, one type selected from the group comprising metal plating, aluminum foil, copper foil and silver foil can be used. Metal foil, such as aluminum foil, copper foil, and silver foil, can be attached by means of an adhesive agent, two sided tape, or the like, and it can be attached inexpensively and easily. In addition, metal plating can be applied by means of electrical plating onto the surface of chemical plating. In addition to the reduction of radiant heat transmission, metal plating has the advantage of increasing the effectiveness of the gas barrier.

A contact preventing projection 72 is formed in the vicinity of the center of the upper surface side of the above-mentioned lower wall 65.

This contact preventing projection 72 supports upper wall 64 from the insulating layer 67 side during the manufacturing process of the above-mentioned lid insulation layer body 68 when the air in the space 66 is vacuum evacuated through penetrating hole 69 after the double walled structure has been formed by joining upper wall 64 and lower wall 65. As a result, it is possible to prevent the penetrating hole 69 of lower wall 65 from becoming stopped up by the pingate trace in the upper wall 64 even when the lower surface of upper wall 64 and the upper surface of lower wall 65 are elastically deformed due to the load of atmospheric pressure.

FIG. 12 and FIG. 14 show an example in which a single cylindrically shaped contact preventing projection 72 has been formed on same side as the penetrating hole 69, in other words on the upper surface of the lower wall 65. It is preferable that the contact preventing projection 72 be provided at a position which is as close to the penetrating hole 69 as possible. The number of contact preventing projections 53 may also be plural.

It is preferable for at least one part of the tip of the contact preventing projection 72 to be separated from the lower surface of the upper wall 64 which is opposite the contact preventing projection 72. By means of this, after vacuum evacuation, when the upper and lower walls 64 and 65 have returned to their original shape due to the introduction of a gas having low thermal conductivity, it is possible to prevent reduction in the insulating efficiency of the lid insulation layer body 68 due to contact between the tip of contact preventing projection 72 and the lower surface of upper wall 64.

FIGS. 17A, 17B, 18A, and 18B are side views and top views of the upper surface of the lower wall 65 which show, as the shape of the contact preventing projection 72, examples of an open cylindrical shaped body positioned on the insulating layer 67 side of the upper surface of the lower wall 65 and, in the circular wall of this cylindrical shaped body, slits or notches which form gas passages for the purpose of vacuum evacuation or gas charging are provided.

Figure 17A:
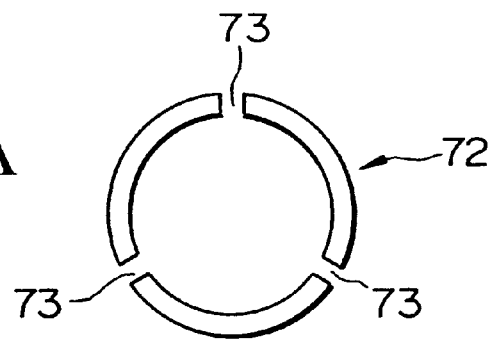
FIG. 17A and FIG. 17B show an example of a contact preventing projection which is provided in the upper surface of the bottom wall of the insulated synthetic resin lid of the present invention.
Figure 17B:
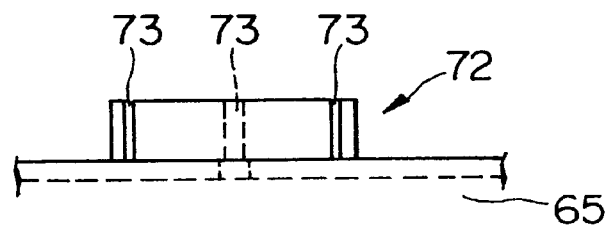

In the example shown in FIGS. 17A and 17B, the shape of the contact preventing projection 72 is made into a open cylindrical shaped body on the insulating layer 67 side, and slits 73, 73 and 73 which have a length reaching the edge of the base of this cylindrical shaped body and a width of approximately 1~3 mm are provided in this cylindrical shaped body. The position and the number of slits 73 is not limited to those shown in this example.

Figure 18A:
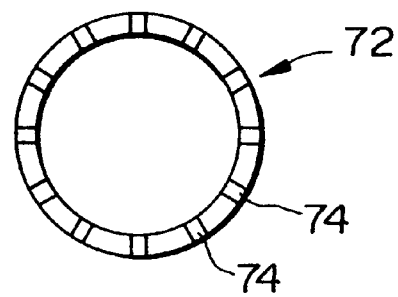
FIG. 18A and FIG. 18B show another example of a contact preventing projection which is provided in the upper surface of the bottom wall of the insulated synthetic resin lid of the present invention.
Figure 18B:
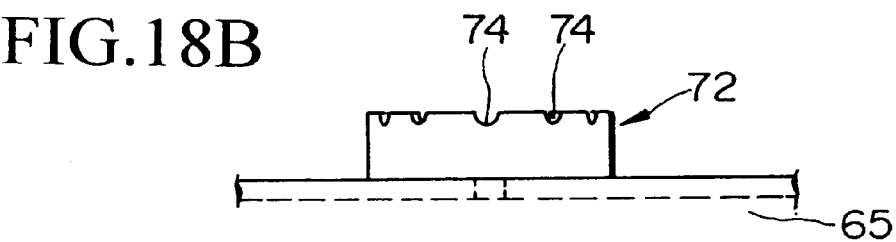

In the example shown in FIGS. 18A and 18B, the shape of the contact preventing projection 72 is made into a open cylindrical shaped body in the insulating layer 67 side, a plurality of notches 74 . . . are provided in the open rim of this open cylindrical shaped body. The position and the number of notches 55 are not limited to those shown in this example.

In addition, holes (not shown in the figures) having a diameter of approximately 1~3 mm can be provided in the side surface of the open cylindrically shaped contact preventing projection 72. The number and position of these holes is not particularly limited. Moreover, the shape of the contact preventing projection 72 is not limited to a cylindrical shape, and cross sections of elliptical and square shapes are also suitable and provide the same effective results in contact prevention.

Furthermore, the radiating projections 17 shown in FIG. 6 can be used as the contact preventing projection 72. In this situation, the number of projections 17 extending in a radiating form is not limited to a specific number. In addition, the length of these radiating projections 17 is also not limited to a specific dimension.

If contact preventing projection 72 structured as in FIGS. 17A, 17B, 18A, and 18B are provided, when conducting vacuum evacuation, the slits 73, notches 74 or holes which are formed in the contact preventing projection 72 function as gas passages and the vacuum evacuation can be conducted effectively, therefore, these conditions are preferable. When charging with a gas having low thermal conductivity, since the charging is conducted with the slits 73, notches 74 and holes functioning as gas passages, there is no delay in the charging.

In addition, if the contact preventing projection 72 comprising the projections 37 which are structured in a radiating form as in FIGS. 11A and 11B are provided, when conducting vacuum evacuation, the gaps between the projections 37 which extend in a radiating condition become gas passages and the vacuum evacuation can be conducted extremely quickly. In addition, when the charging of the gas having low thermal conductivity is conducted, the gaps between the radiating projections 37 become gas passages and the charging can be conducted extremely easily.

In addition, if these radiating projections 37 are used as the contact preventing projection 72, after the upper wall 64 and the lower wall 65 have been joined into a lid insulation layer body 68 having a unitary double walled structure by means of vibration welding or spin welding their respective edges, when this container is removed from the welding machine, it is possible to prevent the occurrence of cracks and the like, and it is possible to prevent deformation of the upper wall 64 by means of the support of the abovementioned radiating projections 37 even when the bottom of the upper wall 64 is pushed by the ejection implement.

In addition, for example, when a hot drink or the like is put into an insulated container 41 obtained by means of the present invention and the opening of the insulated container 41 is covered by the insulated lid 61, the gas having low thermal conductivity which has been sealed in the space 66, formed between the upper wall 64 and the lower wall 65, expands. In consequence of this, the load bears on the generally central section of the upper wall 64 and the lower wall 65 which are formed flat and the strength of which is weak due to the pressure load. However, by means of arranging, on the bottom, the above-mentioned radiating projections 37 of the above-mentioned FIGS. 11A and 11B as the contact preventing projection 72, strength against the pressure load due to the above-mentioned expansion can be obtained. For this reason, it is possible to design thin walls without needing to increase the thickness of the walls of the generally central section of upper wall 64 and lower wall 65. As a result, it is possible to lighten the weight of the insulated container and to reduce costs. This type of situation is not only for the above-mentioned situation in which a hot drink is put into the insulated container, and the same type of effects are exhibited in situations such as when cleaning with hot water, disinfecting, and drying with a drier after the container has been used.

For whatever shape of contact preventing projection 72 used, since a larger surface area for the surface of the tip of the contact preventing projection 72 makes it possible for this surface to widely and uniformly support the pressure of the vacuum evacuation, a wide surface area is preferable from the point of view of preventing damage and scratching of the opposite surface. Consequently, it is preferable for the shape of the tip of the contact preventing projection to be, for example, flat or rounded.

The contact preventing projections 72 of the insulated lid 61 shown in FIGS. 12, 14, 17A, 17B, 18A, and 18B, and the radiating projection 37 shown in FIGS. 11A and 11B are used as the contact preventing projection 72 of insulated lid 61, and all are formed on the same side as the penetrating hole 69 in the upper surface of the lower wall 65. However, as an alternative, it is also possible to provide contact preventing projection 72 on the opposite side to the penetrating hole on the lower surface of the upper wall 64 (the insulating layer 67 side). Furthermore, it is also possible to provide the contact preventing projection 72 in both of the above-mentioned surfaces of the upper and lower walls 64 and 65.

When the contact preventing projection 72 is formed in both of the upper wall 64 and the lower wall 65, it is preferable for the length of the contact preventing projection 72 to be made the same. In addition, in particular, when the contact preventing projection 72 is provided on both the upper wall 64 and the lower wall 65 as the cylindrical shaped body shown in FIGS. 17A and 17B, or in FIGS. 18A and 18B, it is preferable that the pair of contact preventing projections be formed in a concentric circular shape having the penetrating hole 69 as their center. When the radiating projections 37 shown in FIGS. 11A and 11B are provided in both the upper wall 64 and the lower wall 65 as the contact preventing projection 72, it is preferable that the radiating projections 37 of the upper wall 64 and the radiating projections 37 of lower wall 65 be arranged so that they do not come into contact with each other during the vacuum evacuation.

The lid insulation layer body 68 of the above-mentioned structure is installed in the space between the top surface wall 62 and the bottom surface wall 63 and the abovementioned top surface wall 62 and bottom surface wall 63 are joined so as to form a double walled lid by means of a method such as vibration welding or spin welding their respective edges. Since this joining is conducted by means of vibration welding or spin welding, the tightness of the seal of the joint between the top and bottom surface walls 62 and 63 is high and the joint strength is also great.

Figure 19:
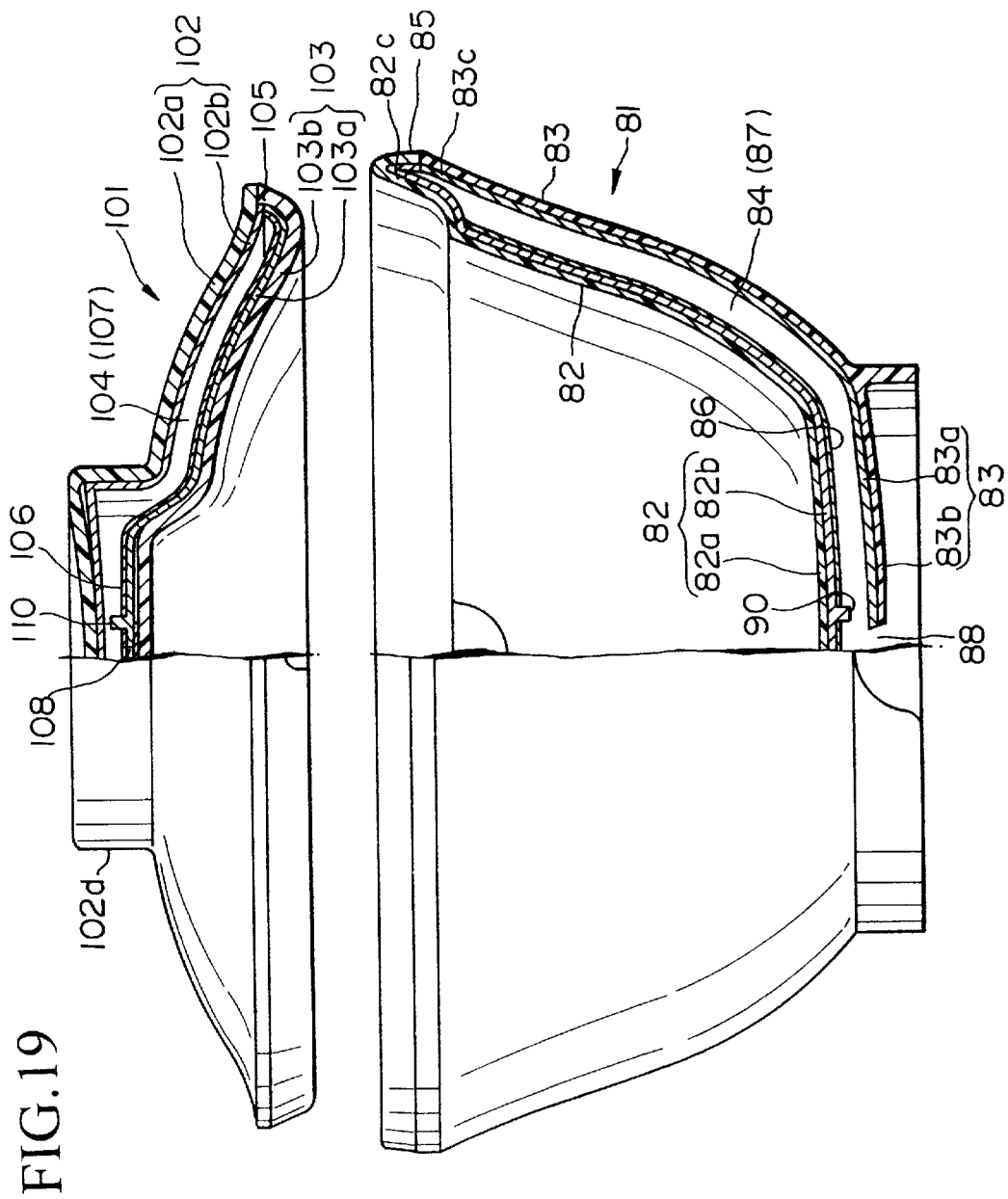
FIG. 19 is a partial cross-section of an embodiment of the insulated synthetic resin container and the insulated synthetic resin lid which have been multi-layer molded of the present invention.

FIGS. 19 and 20 show a different embodiment of the insulated container and the insulated lid of the present invention. The inner container 82 and outer container 83 which form this insulated container 81 are molded using a multi-layered synthetic resin which comprises a plurality of layers of synthetic resins each having a specific function. Inner container 82 is formed by means of double layer molding an inner container inner layer 82a and inner container outer layer 82b, and outer container 83 is formed by means of double-layer molding an outer container inner layer 83a and an outer container outer layer 83b. The inner container 82 and outer container 83 are formed into a double walled container, separated by a space 84, by means of joining them into a single body at the mouth joining section 85 of their respective rims 82c and 83c. An insulating layer 87 is formed by arranging radiation preventing material 86, which comprises metallic foil or the like, arranged in the abovementioned space 84 which is formed between inner container 82 and outer container 83, and by sealing a gas having low thermal conductivity, which comprises at least one of xenon, krypton, and argon, in the above-mentioned space 84.

In addition, as the above-mentioned synthetic resin which can be multi-layered, for example, a synthetic resin material which enhances the properties of a gas barrier (hereinafter referred to as "superior gas barrier property resin") can be used in the inner container outer layer 82b and the outer container inner layer 83a which face on to the space 84 (the insulating layer 87). In addition, on the other hand, synthetic resin material (hereinafter referred to as "water resistant resin") which is heat resistant, water resistant (water-vapor permeability resistant) and mechanically strong can be used in the inner container inner layer 82a and the outer container outer layer 83b which face onto the atmosphere. Specifically, as the superior gas barrier property resin, a synthetic resin material for which the gas permeability (based on ASTM D 1434-58) is less than $1.0 \text{ g/m}^2/24\text{hr/atm}$ with regard to the gases $O_2$, $N_2$ and $CO_2$ can be used. For example, this resin may be any resin selected from among polyesters such as polyethylene terephthalate, polybutylene terephthalate, polyethylene naphthalate; polyamide; ethylene vinyl alcohol; polyvinylidene chloride; polyacrylonitrile; polyvinyl alcohol; and the like. In addition, as the water resistant resin, a synthetic resin material for which the thermal deformation temperature (based on ASTM D 648) is a temperature resistance of more than 100° Cl and for which the water vapor permeability (based on JIS Z 0208) is less than $50 \text{ g/m}^2/24\text{hr/atm}$ can be used. For example, this resin may be any resin selected from among polypropylene, heat and water resistant polycarbonate, and the like.

In the center of the bottom of the outer container 83, a penetrating hole 88 is formed. During the manufacturing process for the insulated container 81, after joining the multi-layer molded inner and outer containers 82 and 83, the above-mentioned penetrating hole 88 is used as an evacuation and introduction opening for replacement and charging using a gas having low thermal conductivity, and, after the charging, the penetrating hole 88 is sealed using an adhesive agent and sealing plate 89. The diameter of this penetrating hole 88 is preferably 0.1~3.0 mm to avoid the adhesive running during the sealing process.

The above-mentioned penetrating hole 88 is sealed by means of the insertion and adhesion of the sealing plate 89. This sealing plate 89 is multi-layer molded from the same superior gas barrier property resin and water resistant resin as the inner and outer container 82 and 83. The surface having the superior gas barrier property resin faces the insulating layer 87 side and the surface having the water resistant resin faces toward the atmosphere side. By means of this, the superior gas barrier property resin of the insulating layer 87 side is protected by means of the water resistant resin, and the gas barrier enhancing properties of sealing plate 89 are well maintained. As a result, leakage of the gas having low thermal conductivity from this section is prevented and there is no concern of a reduction in insulating ability. Moreover, the penetrating hole 88 may be sealed with a cyanoacrylate-type adhesive agent, and then cyanoacrylate-type adhesive agent may be applied to the sealing plate 89 which is then fitted into and adhered to the indented section thereby sealing the penetrating hole 88.

A contact preventing projection 90 is formed in the vicinity of the center of the bottom of the above-mentioned inner container outer layer 82*b* of the insulated container 81 structured in the above way.

This contact preventing projection 90 supports outer container 83 from the insulating layer 87 side during the manufacturing process of the above-mentioned insulated container 81 when the air in the space 84 is vacuum evacuated through penetrating hole 88 after the double walled structure has been formed by joining inner container 82 and outer container 83. As a result, it is possible to prevent the penetrating hole 88 of outer container 83 from becoming stopped up by the pingate trace of inner container 82 even when the outer surface of the inner container 82 and the inner surface of outer container 83 are elastically deformed due to the load of atmospheric pressure.

FIG. 19 and FIG. 20 show an example in which a single cylindrically shaped contact preventing projection 90 has been formed on the inner container outer layer 82*b* which lines the space 84 and which is opposite to the penetrating hole 88. It is essential that this contact preventing projection 90 be provided at a position in which it will not block the penetrating hole 88 when the outer container 83 and the inner container 82 are elastically deformed during the vacuum evacuation, and it is preferable that it is provided at a position which is as close to the penetrating hole 88 as possible. The number of contact preventing projections 90 may also be plural, and when a plurality of individual contact preventing projections 90 are provided, it is possible to prevent blockage of the penetrating hole 88 even when the bottom surface is particularly wide and flat in shape.

It is preferable for at least one part of the tip of the contact preventing projection 90 to be separated from the outer container inner layer 83*a* which is opposite the contact preventing projection 90. By means of this, after vacuum evacuation, when the inner and outer containers 82 and 83 have returned to their original shape due to the introduction of a gas having low thermal conductivity, it is possible to prevent reduction in the insulating efficiency of the insulated container 81 due to contact between the tip of contact preventing projection 90 and the outer container inner layer 83*a*.

FIGS. 21A, 21B, 22A, and 22B are side views and bottom views of the center of the bottom of inner container outer layer 82*b* which show, as the shape of the contact preventing projection 90, examples of an open cylindrical shaped body positioned on the insulating layer 87 side of the inner container outer layer 82*b* and, in the circular wall of this cylindrical shaped body, slits or notches which form gas passages for the purpose of vacuum evacuation or gas charging are provided.

Figure 21A:
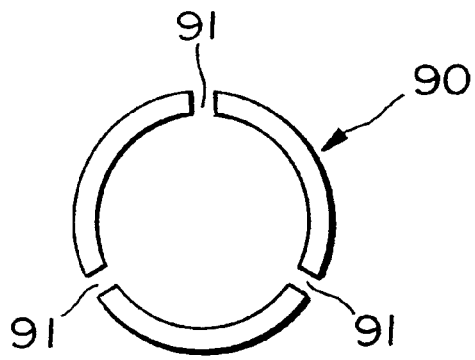
FIG. 21A and FIG. 21B show an example of a contact preventing projection which is provided in the center of the outer layer of the inner container of the multi-layer molded insulated synthetic resin container of the present invention.
Figure 21B:
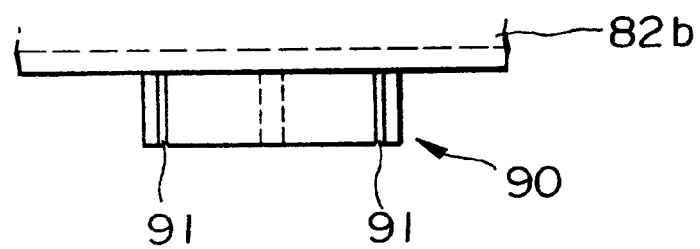

In the example shown in FIGS. 21A and 21B, the shape of the contact preventing projection 90 is made into an open cylindrical shaped body on the insulating layer 87 side, and slits 91, 91 and 91 which have a length reaching the edge of the base of this cylindrical shaped body and a width of approximately 1–3 mm are provided in this cylindrical shaped body. The position and the number of slits 91 is not limited to those shown in this example.

Figure 22A:
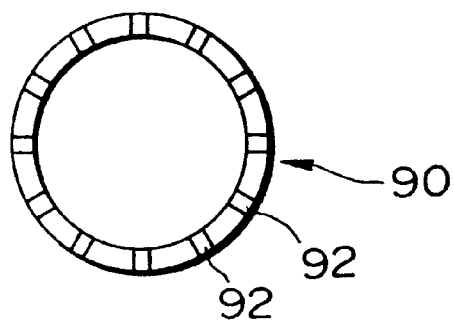
FIG. 22A and FIG. 22B show another example of a contact preventing projection which is provided in the center of the outer layer of the inner container of the multi-layer molded insulated synthetic resin container of the present invention.
Figure 22B:
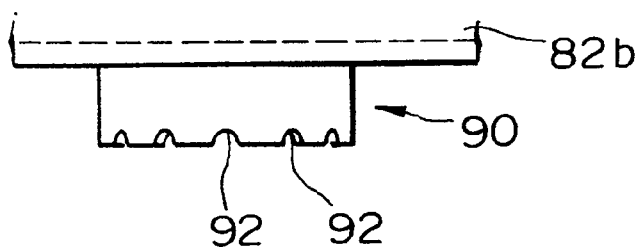

In the example shown in FIGS. 22A and 22B, the shape of the contact preventing projection 90 is made into a open cylindrical shaped body in the insulating layer 87 side, a plurality of notches 92 . . . are provided in the rim of this cylindrical shaped body. The position and the number of notches 92 are not limited to those shown in this example. In addition, holes having a diameter of approximately 1–3 mm can be provided in the side surface of the open cylindrically shaped contact preventing projection 90. The number and position of these holes is not particularly limited. Moreover, the shape of this contact preventing projection is not limited to a cylindrical shape, and cross sections of elliptical and square shapes are also suitable and provide the same effective results in contact prevention.

Furthermore, the radiating projections 17 illustrated in FIG. 6 can be used as the contact preventing projection 90. In this situation, the number of projections 17 extending in a radiating form is not limited to a specific number. In addition, the length of these radiating projections 17 is also not limited to a specific dimension.

If contact preventing projection 90 structured as in FIGS. 21A, 21B, 22A, and 22B are provided, when conducting vacuum evacuation, the slits 91, notches 92 or holes which are formed in the contact preventing projection 90 function as gas passages and the vacuum evacuation can be conducted effectively, therefore, these conditions are preferable. When charging with a gas having low thermal conductivity, since the charging is conducted with the slits 91, notches 92 and holes functioning as gas passages, there is no delay in the charging.

In addition, if the radiating projections 17 structured as shown in FIG. 6 are provided as the contact preventing projection 90, when conducting vacuum evacuation, the gaps between the projections 17 which extend in a radiating condition become gas passages and the vacuum evacuation can be conducted extremely quickly. In addition, when the charging of the gas having low thermal conductivity is conducted, the gaps between the radiating projections 17 become gas passages and the charging can be conducted extremely easily.

Furthermore, if these radiating projections 17 are used as the contact preventing projection 90, after the outer container 83 and the inner container 82 have been joined into a single body as a container having a unitary double walled structure by means of vibration welding or spin welding their respective edges, when this container is removed from the welding machine, it is possible to prevent the occurrence of cracks and the like, and it is possible to prevent deformation of the outer container 83 by means of the support of the above-mentioned radiating projections 17 even when the bottom of the container 83 is pushed by the ejection implement.

In addition, for example, when a hot drink or the like is put into an insulated container 81 obtained by means of the present invention, the gas having low thermal conductivity which has been sealed in the space 84, formed between outer container 83 and the inner container 82, expands. In consequence of this, the load bears on the generally central section of the outer container 83 and the inner container 82 which are formed flat and the strength of which is weak due to the pressure load. However, by means of arranging, on the bottom, the abovementioned radiating projections 17 of the above-mentioned FIG. 6 as the contact preventing projection 90, strength against the pressure load due to the above-mentioned expansion can be obtained. By means of this, it is possible to design thin walls without needing to increase the thickness of the walls of the generally central section of inner container 82 and outer container 83. As a result, it is possible to lighten the weight of the insulated container and to reduce costs. This type of situation is not only for the above-mentioned situation in which a hot drink is put into the insulated container, and the same type of effects are exhibited in situations such as when cleaning with hot water, disinfecting, and drying with a drier after the container has been used.

For whatever shape of contact preventing projection 90 used, since a larger surface area for the surface of the tip of the contact preventing projection 90 makes it possible for this surface to widely and uniformly support the pressure of the vacuum evacuation, a wide surface area is preferable from the point of view of preventing damage and scratching of the opposite surface. Consequently, it is preferable for the shape of the tip of the contact preventing projection 90 to be flat or rounded.

The contact preventing projections 90 shown in FIG. 19, FIG. 20, FIG. 21A, FIG. 21B, FIG. 22A and FIG. 22B and the radiating projection 17 shown in FIG. 6 which are used as the contact preventing projection 90 are shown, as examples, formed in the inner container outer layer 82b which is opposite the penetrating hole 88 and which is arranged on the other side of space 84. However, as an alternative, it is also possible to provide contact preventing projection 90 with the same structure on the same side as the penetrating hole 88 on the outer container inner layer 83a (the insulating layer 87 side). Furthermore, it is also possible to provide the contact preventing projection 90 in both of the above-mentioned layers of the inner and outer containers 82 and 83.

When the contact preventing projection 90 is formed in both of the inner container outer layer 82b and the outer container inner layer 83a, it is preferable for the length of the contact preventing projection 90 to be made the same. In addition, when the contact preventing projection 90 is provided on both the inner container outer layer 82b and the outer container inner layer 83a as the cylindrical shaped body shown in FIGS. 21A and 21B, or in FIGS. 22A and 22B, it is preferable that the pair of contact preventing projections 90 be formed in a concentric circular shape having the penetrating hole 88 as their center.

When the radiating projections 17 shown in FIG. 6 are provided in both the outer container inner layer 83a and the inner container outer layer 82b as the contact preventing projection 90 (not shown in the Figures), it is preferable that the radiating projections 17 of the outer container inner layer 83a and the radiating projections 17 of inner container outer layer 82b be arranged so that they do not come into contact with each other during the vacuum evacuation.

In the insulated container 81 having the above-mentioned structure, outer container 83 and inner container 82 are formed into a double walled container leaving a space 84 therebetween by means of a method such as vibration welding or spin welding the respective edges of the above-mentioned outer container 83 and the above-mentioned inner container 82. Since this joining is conducted by means of vibration welding or spin welding, the tightness of the seal of the joint between the inner and outer containers 82 and 83 is high and the joint strength is also great.

The opening of the insulated container 81 of the above-mentioned structure is covered by insulated lid 101 in a removable manner.

As shown in FIG. 19, this insulated lid 101 is a double walled lid comprising a top surface wall 102 and a bottom surface wall 103 which are multi-layer injection molded using synthetic resins each of which has a specific function in the same way as the above-mentioned insulated container 81. A space 104 lies between this top surface wall 102 and bottom surface wall 103. The top surface wall 102 and the bottom surface wall 103 are made unitary by weld bonding at the rim contact section 105 of their respective edges into a single body. More specifically, top surface wall 102 and bottom surface wall 103 are made by means of a synthetic resin having a plurality of layers. Top surface wall 102 comprises top surface wall upper layer 102a and top surface wall lower layer 102b, and bottom surface wall 103 comprises bottom surface wall upper layer 103a and bottom surface wall lower layer 103b. In the same way as for the above-mentioned insulated container 81, the top surface wall lwer layer 102b and the bottom surface wall upper layer 103a, which are layers which face onto the space 104, are formed by a superior gas barrier property resin. In addition, on the other hand, the top surface wall upper layer 102a and the bottom surface wall lower layer 103b, which are layers which face the atmosphere, are formed using water resistant resin. The superior gas barrier property resin and the water resistant resin are explained in detail in the above explanation of the embodiment of insulated container 81 which is multi-layer molded, and this can be effectively used in the same way for the insulated lid 101 which is also multi-layer molded.

A radiation preventing material 106 which comprises metallic foil arranged on the space 104 of the insulated lid 101 structured in the above way, and an insulating layer 107 is formed by enclosing at least one type of gas having low thermal conductivity from within the group comprising xenon, krypton, and argon within the space 104 of the insulated lid 101.

In the center of the bottom of the bottom surface wall 103, a penetrating hole 108 is formed. During the manufacturing process for the insulated lid 101, after joining the multilayer molded top and bottom surface walls 102 and 103 into a single body, the abovementioned penetrating hole 108 is used as an evacuation and introduction opening for replacement and charging using a gas having low thermal conductivity, and, after the charging, the penetrating hole 108 is sealed using an adhesive agent and sealing plate 109. The diameter of this penetrating hole 108 is preferably 0.1~3.0 mm to avoid the adhesive running during the sealing process.

The above-mentioned penetrating hole 108 is sealed by means of the insertion and adhesion of the sealing plate 109. This sealing plate 109 is multi-layer molded from the same superior gas barrier property resin and water resistant resin as the top and bottom surface walls 102 and 103. The surface having the superior gas barrier property resin faces the insulating layer 107 side and the surface having the water resistant resin faces toward the atmosphere side. By means of this, the superior gas barrier property resin of the insulating layer 107 side is protected by means of the water resistant resin, and the gas barrier enhancing properties of sealing plate 109 are well maintained. As a result, leakage of the gas having low thermal conductivity from this section is prevented and there is no concern of a reduction in insulating ability. Moreover, the penetrating hole 108 may be sealed with a cyanoacrylate-type adhesive agent, and then cyanoacrylate-type adhesive agent may be applied to the sealing plate 109 which is then fitted into and adhered to the indented section thereby sealing the penetrating hole 108.

The insulated lid 101 is formed by top surface wall 102 and bottom surface wall 103 which are separated by space 104. The above-mentioned top surface wall 102 and bottom surface wall 103 are joined into a single body at the mouth joining section 105 of their respective edges to form a double walled structured lid by a method such as vibration welding, spin welding, or the like. Since this joining is conducted by means of vibration welding or spin welding, the tightness of the seal of the joint of the top and bottom walls is high and the joint strength is also great.

A contact preventing projection 110 is formed in the vicinity of the center of the bottom of the above-mentioned bottom surface wall upper layer 103a of the insulated lid 101 which is structured in the above-mentioned way. This contact preventing projection 110 supports top surface wall 102 from the insulating layer 107 side during the manufacturing process of the above-mentioned insulated lid 101 when the air in the space 104 is vacuum evacuated through penetrating hole 108 after the double walled structure has been formed by joining top surface wall 102 and bottom surface wall 103 into a single body. As a result, it is possible to prevent the penetrating hole 108 of bottom surface wall 103 from becoming stopped up by the pingate trace in the top surface wall 102 even when the lower surface of top surface wall 102 and the upper surface of bottom surface wall 103 are elastically deformed due to the load of atmospheric pressure.

FIG. 19 and FIG. 20 show an example in which a single cylindrically shaped contact preventing projection 110 has been formed within the space 104 on same side as the penetrating hole 108, in other words, on the bottom surface wall upper layer 103a. It is essential that this contact preventing projection 110 be provided at a position in which it will not block the penetrating hole 108 when the top surface wall 102 and the bottom surface wall 103 are elastically deformed during the vacuum evacuation of space 104, and it is preferable that it be provided at a position which is as close to the penetrating hole 108 as possible. The number of contact preventing projections 110 may also be plural, and when a plurality of individual contact preventing projections 110 are provided, it is possible to prevent blockage of the penetrating hole 108 even when the bottom surface is particularly wide and flat in shape.

In conditions of atmospheric pressure, it is preferable for at least one part of the tip of the contact preventing projection 110 to be separated from the top surface wall lower layer 102b which is opposite the contact preventing projection 110. By means of this, after vacuum evacuation, when the top and bottom surface walls 102 and 103 have returned to their original shape due to the introduction of a gas having low thermal conductivity, it is possible to prevent reduction in the insulating efficiency of the insulated lid 101 due to contact between the tip of contact preventing projection 110 and the top surface wall lower layer 102b.

FIGS. 23A, 23B, 24A, and 24B are side views and bottom views of the center of top surface wall lower layer 102b which show, as the shape of the contact preventing projection 110, examples of an open cylindrical shaped body positioned on the insulating layer 107 side of the top surface wall lower layer 102b and, in the circular wall of this cylindrical shaped body, slits or notches which form gas passages for the purpose of vacuum evacuation or gas charging are provided.

Figure 23A:
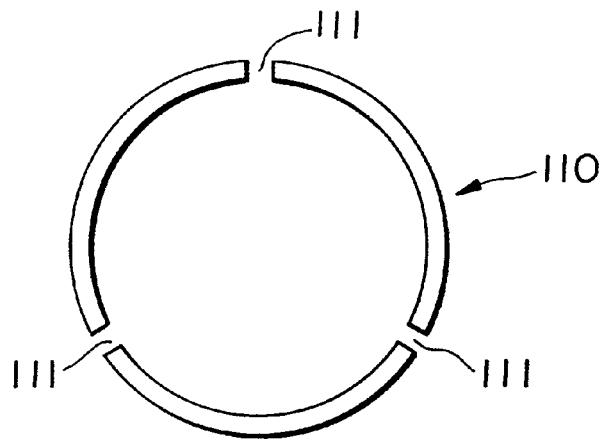
FIG. 23A and FIG. 23B show an example of a contact preventing projection which is provided in the lower layer of the top surface wall of the multi-layer molded insulated synthetic resin lid of the present invention.
Figure 23B:
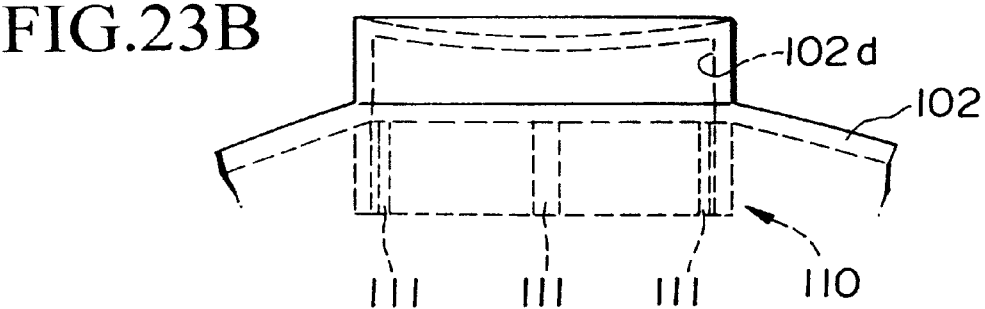

In the example shown in FIGS. 23A and 23B, the shape of the contact preventing projection 110 is made into an open cylindrical shaped body on the insulating layer 107 side, and slits 111, 111 and 111 which have a length reaching the edge of the base of this cylindrical shaped body and a width of approximately 1~3 mm are provided in this cylindrical shaped body. The position and the number of slits 111 is not limited to those shown in this example.

Figure 24A:
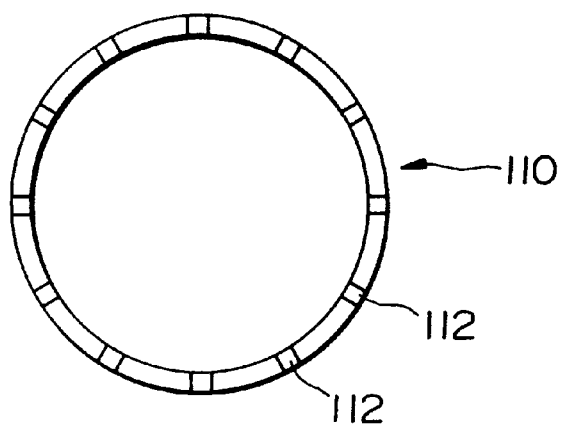
FIG. 24A and FIG. 24B show another example of a contact preventing projection which is provided in the lower layer of the top surface wall of the multi-layer molded insulated synthetic resin lid of the present invention.
Figure 24B:
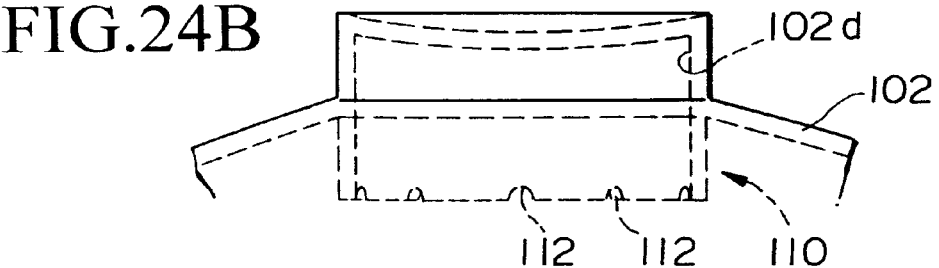

In the example shown in FIGS. 24A and 24B, the shape of the contact preventing projection 110 is made into a open cylindrical shaped body in the insulating layer 107 side, a plurality of notches 112 . . . are provided in the rim of this cylindrical shaped body. The position and the number of notches 112 are not limited to those shown in this example. In addition, holes (not shown in the figures) having a diameter of approximately 1~3 mm can be provided in the side surface of the open cylindrically shaped contact preventing projection 110. The number and position of these holes is not particularly limited. Moreover, the shape of this contact preventing projection is not limited to a cylindrical shape, and cross sections of elliptical and square shapes are also suitable and provide the same effective results in contact prevention.

Furthermore, the radiating projections 37 illustrated in FIGS. 11A and 11B can be used as the contact preventing projection 110. In this situation, the number of projections 37 extending in a radiating form is not limited to a specific number. In addition, the length of these radiating projections 37 is also not limited to a specific dimension.

If contact preventing projection 110 structured as in FIGS. 23A, 23B, 24A, and 24B are provided, when conducting vacuum evacuation, the slits 111, notches 112 or holes which are formed in the contact preventing projection 110 function as gas passages and the vacuum evacuation can be conducted effectively, therefore, these conditions are preferable. When charging with a gas having low thermal conductivity, since the charging is conducted with the slits 111, notches 112 and holes functioning as gas passages, there is no delay in the charging.

In addition, if the radiating projections 37 structured as shown in FIGS. 11A and 11B are provided as the contact preventing projection 110, when conducting vacuum evacuation, the gaps between the projections 37 which extend in a radiating condition become gas passages and the vacuum evacuation can be conducted extremely quickly. In addition, when the charging of the gas having low thermal conductivity is conducted, the gaps between the radiating projections 37 become gas passages and the charging can be conducted extremely easily.

Furthermore, if these radiating projections 37 are used as the contact preventing projection 110, after the top surface wall 102 and the bottom surface wall 103 have been joined into a single body as a lid having a unitary double walled structure by means of vibration welding or spin welding their respective edges, when this lid is removed from the welding machine, it is possible to prevent the occurrence of cracks and the like, and it is possible to prevent deformation of the bottom surface wall 103 by means of the support of the abovementioned radiating projections 37 even when the bottom of the bottom surface wall 103 is pushed by the ejection implement.

In addition, for example, when a hot drink or the like is put into an insulated container 81 obtained by means of the present invention and the opening of the insulated container is covered by the insulated lid 101, from the point of view of the insulated lid 101, the gas having low thermal conductivity which has been sealed in the space 104, formed between bottom surface wall 103 and the top surface wall 102 of the insulated lid 101, is heated by the heat of the contained drink and expands. In consequence of this, the load bears on the generally central section of the top surface wall 102 and the bottom surface wall 103 which are formed flat and the strength of which is weak due to the pressure load. However, by means of arranging, on at least one of the top surface wall and the bottom surface wall 103, the abovementioned radiating projections 37 of the abovementioned FIGS. 11A and 11B as the contact preventing projection 110, strength against the pressure load due to the abovementioned expansion can be obtained. By means of this, it is possible to design thin walls without needing to increase the thickness of the walls of the generally central section of top surface wall 102 and bottom surface wall 103. As a result, it is possible to make the insulated lid lightweight and to reduce costs. This type of situation is not only for the above-mentioned situation in which a hot drink is put into the insulated container, and the same type of effects are exhibited in situations such as when cleaning with hot water, disinfecting, and drying with a drier after the container has been used.

For whatever shape of contact preventing projection 110 used, since a larger surface area for the surface of the tip of the contact preventing projection 110 makes it possible for this surface to widely and uniformly support the pressure of the vacuum evacuation, a wide surface area is preferable from the point of view of preventing damage and scratching of the opposite surface. Consequently, it is preferable for the shape of the tip of the contact preventing projection 110 to be flat or rounded.

The contact preventing projections 110 shown in FIG. 19, FIG. 23A, FIG. 23B, FIG. 24A and FIG. 24B, and the radiating projection 37 shown in FIGS. 11A and 11B which are used as the contact preventing projection 110 are shown, as examples, formed in the top surface wall lower layer 102b which is opposite the penetrating hole 108 and which is arranged on the other side of the space 104. However, as an alternative, it is also possible to provide contact preventing projection 110 on the same side as the penetrating hole 108 on the bottom surface wall upper layer 103a (the insulating layer 107 side). Furthermore, it is also possible to provide the contact preventing projection 110 in both of the above-mentioned layers of the top and bottom surface wall 102 and 103.

When the contact preventing projection 110 is formed in both of the top surface wall lower layer 102b and the bottom surface wall upper layer 103a, it is preferable for the length of the contact preventing projection 110 to be made the same. In addition, when the contact preventing projection 110 is provided on both the top surface wall lower layer 102b and the bottom surface wall upper layer 103a as the cylindrical shaped body shown in FIGS. 23A, 23B, 24A and 24B, it is preferable that the pair of contact preventing projections 110 be formed in a concentric circular shape having the penetrating hole 108 as their center.

When the radiating projections 37 shown in FIGS. 11A and 11B are provided in both the top surface wall lower layer 102b and the bottom surface wall upper layer 103a as the contact preventing projection 110, it is preferable that the radiating projections 37 of the top surface wall lower layer 102b and the radiating projections 37 of bottom surface wall upper layer 103a be arranged so that they do not come into contact with each other during the vacuum evacuation.

In the insulated lid 101 having the above-mentioned structure, bottom surface wall 103 and top surface wall 102 are formed into a double walled lid leaving a space 104 therebetween by means of a method such as vibration welding or spin welding the respective edges of the abovementioned bottom surface wall 103 and the abovementioned top surface wall 102. Since this joining is conducted by means of vibration welding or spin welding, the tightness of the seal of the joint between the top and bottom surface walls 102 and 103 is high and the joint strength is also great.

In the above-mentioned ways, in each of the above embodiments of the present invention, the contact preventing projection 14, the contact preventing projection 32, the contact preventing projection 53, the contact preventing projection 72, the contact preventing projection 90, the contact preventing projection 110, and the radiating projections 17 and 37 have the function of supporting the double walled structure from the insulating layer side in such a way that the penetrating hole does not become stopped up, even when bearing the load of atmospheric pressure when the air in the space is vacuum evacuated. In the following the function of the contact preventing projections will be further explained with reference to the Figures.

Figure 25:
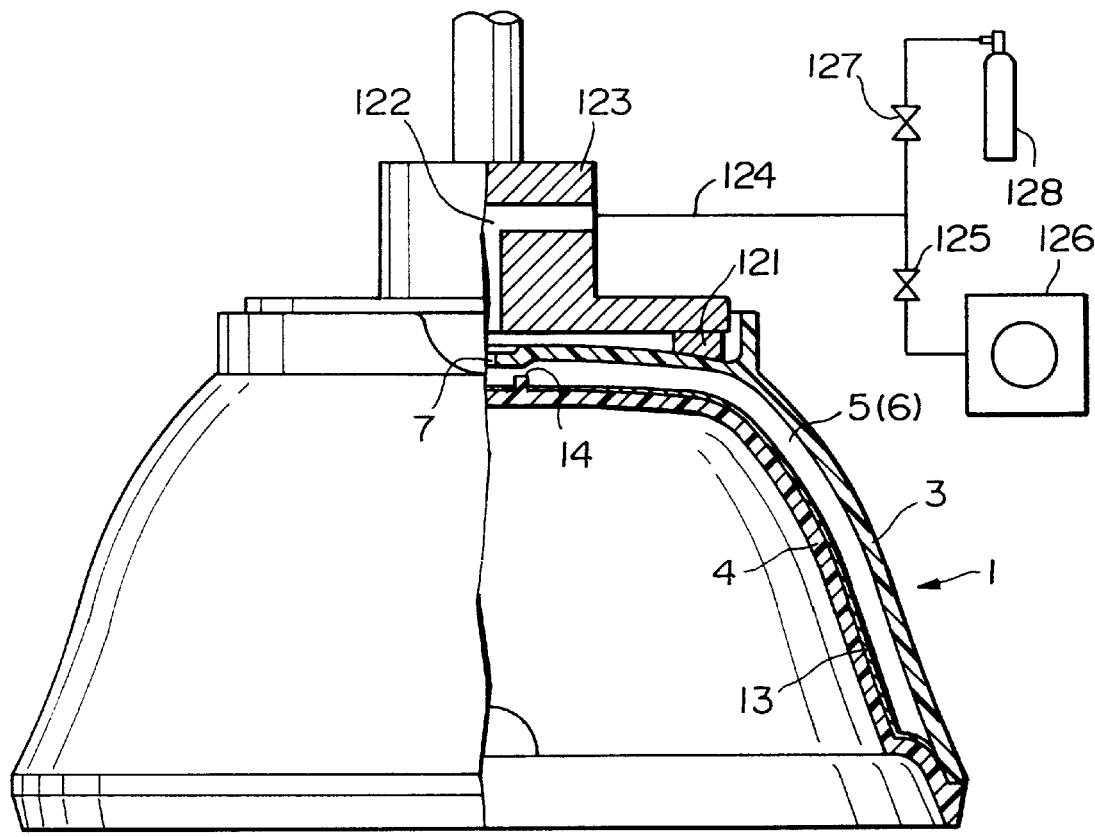
FIG. 25 is a diagram for the purpose of explaining the manufacturing processes for the insulated synthetic resin container of the present invention and it shows the condition in which the gas exchange implement is attached to the bottom of the container for the purpose of replacing the gas in the space.
Figure 26:
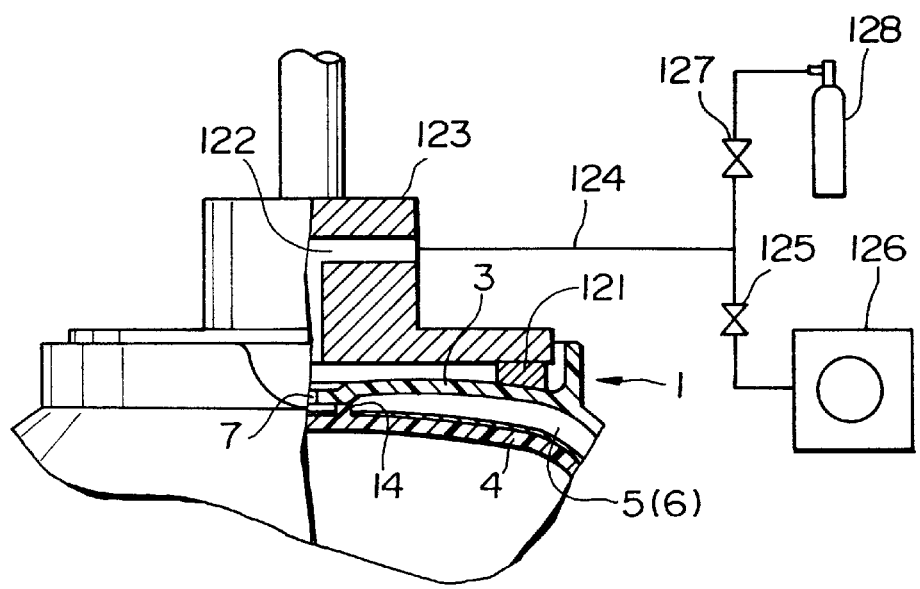
FIG. 26 is a diagram for the purpose of explaining the manufacturing processes for the insulated synthetic resin container of the present invention and it shows the condition for vacuum evacuation of the space.

FIG. 25 and FIG. 26 are for the purpose of explaining the manufacturing process of the insulated container 1 shown in the above-mentioned FIG. 1 of the present invention. FIG. 25 shows the condition in which a gas exchange implement is attached for the purpose of replacing the contents of the space 5 of the insulated container 1 with a gas having low thermal conductivity. FIG. 26 shows the condition of the inner and outer containers 4 and 3 at a time when the space 5 has been vacuum evacuated and just prior to charging of the low thermal conduction gas within space 5. The insulated container 1 shown in these figures is the insulated container 1 shown in FIG. 1 and the radiation preventing material 13 which lines the inner surface of the outer container 3 has been omitted.

As shown in FIG. 25, for the purpose of the replacement of the contents of space 5 with a gas having low thermal conductivity, first, a gas exchange implement 123 installed such that gas passage 122 is arranged, with packing 121 in between, on the outer surface of outer container 3 in which a penetration hole 7 has been punched. Next, the air in the space 5 is evacuated to 10 Torr or below by means of vacuum pump 126 via gas exchange implement 123, pipe 124, valve 125, and the like. In this situation, valve 127 is left closed. As shown in FIG. 26, as the vacuum evacuation progresses, the inner container 4 and the outer container 3 become deformed as a result of bearing the load of atmospheric pressure due to the vacuum evacuation, but penetrating hole 7 which is provided in the bottom of outer container 3 does not become stopped up by the inner container 4 because the bottom of outer container 3 is supported by the contact preventing projection 14 provided on the inner container 4.

After this, valve 125 is closed, valve 127 is opened, and a gas having low thermal conductivity is charged into the inside of space 5 to approximately atmospheric pressure from inert gas cylinder 128 via valve 127, pipe 124, and gas exchange implement 123. At this time as well, since penetrating hole 7 is not stopped up, the charging of the gas is conducted without any hindrance.

Embodiment 1

The insulated container 1 and insulated lid 2 shown in FIGS. 1 through FIG. 3 were manufactured.

Firstly, in the manufacture of the insulated container 1, the inner container 4 and the outer container 3 were injection molded with a wall thickness of 2 mm using a product called Iupilon (manufactured by Mitsubishi Engineering Plastics) which is a mixed resin of polycarbonate and polyethylene terephthalate. In this case, the inner container 4 and outer container 3 were put together such that the width of the gap of space 5 was 5 mm. In addition, a column shaped contact preventing projection having a diameter of 2 mm and a height of 3 mm was formed on the outer surface of the bottom of the inner container 4. A penetrating hole 7 having a diameter of 1 mm was formed in the center of the bottom of outer container 3 As radiation preventing material 13, copper plating was formed on the outer surface of the inner container 4 and the inner surface of the outer container 3. After that, a container having a double-walled structure was made by joining into a single body the rims of inner container 4 and outer container 3 using a vibration welder (not shown in the figure).

After that, in the same way as shown in FIG. 25, a gas exchange implement 123 was fitted over the outer surface of the bottom of outer container 3 in which penetrating hole 7 had been punched, packing 121 was positioned between the implement 123 and the outer container 3, and the air in the space 5 was evacuated to 10 Torr or less through the gas exchange implement 123, the piping 124, and the valve 125 using vacuum pump 126. At this time, as shown in FIG. 26, the inner container 4 and the outer container 3 were deformed by the load of atmospheric pressure due to the vacuum evacuation. However, the penetrating hole 7 was not stopped up by inner container 4 because the bottom of outer container 3 was supported by the contact preventing projection 14 provided on inner container 4.

After that, valve 125 was closed, valve 127 was opened, and krypton gas was charged into space 5 from inert gas cylinder 128 to a pressure of approximately atmospheric pressure.

After that, the packing 121 and the gas exchange implement 123 were removed, and penetrating hole 7 was sealed by means of sealing plate 9 using a cyanoacrylate-type adhesive agent, thereby forming an insulated container 1 having an insulating layer 6.

In the same way, an insulated lid 2 was manufactured.

The top surface wall 21 and the bottom surface wall 22 were injection molded with a wall thickness of 2 mm using a product called Iupilon (manufactured by Mitsubishi Engineering Plastics) which is a mixed resin of polycarbonate and polyethylene terephthalate. In addition, a column shaped contact preventing projection 32 having a diameter of 2 mm and a height of 3 mm was formed on the lower surface of the top surface wall 21. A penetrating hole 25 having a diameter of 1 mm was formed in the center of the bottom of bottom surface wall 22. As radiation preventing material 31, copper plating was formed on lower surface of the top surface wall 21 and the upper surface of the bottom surface wall 22. After that, a lid having a double-walled structure was made by joining into a single body the rim of the top and bottom surface walls 21 and 22 using a vibration welder. Next, in the same way as for the above-mentioned insulated container 1, using the gas exchange method shown in FIG. 25, a gas exchange implement 123 was fitted over the lower surface of the bottom surface wall 22, packing 121 was positioned between the implement 123 and the bottom surface wall 22, and the air in the space 23 was evacuated to 10 Torr or less. At this time, the top surface wall 21 and the bottom surface wall 22 were deformed by the load of atmospheric pressure due to the vacuum evacuation. However, the penetrating hole 25 was not stopped up by top surface wall 21 because the bottom surface wall 22 was supported by the contact preventing projection 32 provided on top surface wall 21.

After that, krypton gas was charged into space 23 to a pressure of approximately atmospheric pressure, the packing 121 and the gas exchange implement 123 were removed, and penetrating hole 25 was sealed by means of sealing plate 27 using a cyanoacrylate-type adhesive agent, thereby forming an insulated lid 2.

300 cc of 95° C. water were put into the manufactured insulated container 1 and the opening of the insulated container 1 was closed using insulated lid 2, as a result, the temperature of the water after 1 hour had past was 72° C., thereby confirming that the insulated container and insulated lid have excellent heat retaining properties.

Embodiment 2

The insulated container 41 and insulated lid 61 shown in FIG. 12 were manufactured.

First, in the manufacture of the insulated container 41, the inner wall 45 and the outer wall 46 were injection molded with a wall thickness of 1 mm using a product called EVAL (manufactured by Kurare Ltd.) which is a polyethylene vinyl alcohol-type synthetic resin. In this case, the inner and outer walls 45 and 46 were put together such that the width of space 47 was 5 mm. In addition, a circular shaped contact preventing projection 53 having the center of the outer surface of the bottom of the inner wall 45 as its center and having a wall thickness of 1 mm and a height of 3 mm was formed. In addition, three slits having a width of 1 mm were formed at regular intervals in the contact preventing projection 53. A penetrating hole 50 having a diameter of 1 mm was formed in the center of the bottom of outer wall 45. As radiation preventing material 52, aluminum foil was attached to the outer surface of the inner wall 45 using double sided tape. After that, an insulated container having a double-walled structure was obtained by joining unitarily the rims of inner and outer walls 45 and 46 using a vibration welder. Next, in the same way as for the above-mentioned first embodiment, a gas exchange implement 123 was fitted over the outer surface of the outer wall 46 with packing 121 positioned between the implement 123 and the outer wall 46, and the air in the space 47 was evacuated to 10 Torr or less. At this time, the outer wall 46 and the inner wall 45 were deformed by the load of atmospheric pressure due to the vacuum evacuation. However, the penetrating hole 50 was not stopped up by inner wall 45 because the outer wall 46 was supported by the contact preventing projection provided on inner wall 45.

After that, krypton gas was charged into space 47 from inert gas cylinder 128 to a pressure of approximately atmospheric pressure, the packing and the gas exchange implement were removed, and penetrating hole 50 was sealed by means of sealing plate 51 using a cyanoacrylate-type adhesive agent, and thereby forming an insulation layer body 49.

Next, the insulation layer body 49 was fitted into the space 44 formed by inner and outer containers 42 and 43 which had a wall thickness of 1.5 mm and which had been formed from polypropylene by means of injection molding. The edges of the inner and outer containers 42 and 43 were joined using a vibration welder, thereby forming insulated container 41. In this case, the width of the space 44 formed by the inner and outer containers 42 and 43 was 7 mm.

In the same way, an insulated lid 61 was manufactured. In the manufacture of the insulated lid 61, the upper wall 64 and the lower wall 65 were injection molded with a wall thickness of 1 mm using a product called EVAL (manufactured by Kurare Ltd.) which is a polyethylene vinyl alcohol-type synthetic resin. In this case, the upper and lower walls 64 and 65 were put together such that the width of space 66 was 5 mm. In addition, a circular shaped contact preventing projection 72 having the center of the outer surface of the bottom of the lower wall 65 as its center and having a wall thickness of 1 mm and a height of 3 mm was formed. In addition, three slits having a width of 1 mm were formed at regular intervals in the contact preventing projection 72. A penetrating hole 69 having a diameter of 1 mm was formed in the center of the bottom of the lower wall 65. As radiation preventing material 71, aluminum foil was attached to the outer surface of the lower wall 65 using double sided tape. After that, a lid for use with an insulated container having a double-walled structure was obtained by unitarily joining the rims of upper and lower walls 64 and 65 using a vibration welder. Next, a gas exchange implement 123 was fitted over the lower surface of the lower wall 65 with packing 121 positioned between the implement 123 and the lower wall 65, and the air in the space 66 was evacuated to 10 Torr or less. At this time, the upper wall 64 and the lower wall 65 were deformed by the load of atmospheric pressure due to the vacuum evacuation. However, the penetrating hole 69 was not stopped up by upper wall 64 because the upper wall 64 was supported by the contact preventing projection 72 provided on lower wall 65.

After that, krypton gas was charged into space 66 from inert gas cylinder 128 to a pressure of approximately atmospheric pressure, the packing 121 and the gas exchange implement 123 were removed, and penetrating hole 69 was sealed by means of sealing plate 70 using a cyanoacrylate-type adhesive agent, and thereby a lid insulation layer body 68 was formed.

Next, the lid insulation layer body 68 was fitted into the space formed by top and bottom surface walls 62 and 63 which had a wall thickness of 1.5 mm and which had been formed from polypropylene by means of injection molding. The edges of the top and bottom surface walls 62 and 63 were joined into a single body using a vibration welder, thereby forming insulated lid 61. In this case, the width of the space formed by the top and bottom surface walls 62 and 63 was 7 mm.

As a test, 300 cc of 95° C. water were put into the manufactured insulated container 41 and the opening of the insulated container 41 was closed using insulated lid 61, the result was that the temperature of the water after 1 hour had past was 72° C., thereby confirming that the insulated container and insulated lid have excellent heat retaining properties.

Embodiment 3

Next, the multi-layer molded insulated container 81 and insulated lid 101 shown in FIGS. 19 were manufactured.

In the manufacture of this insulated container 81, the outer container 83 and the inner container 82 were multi-layer molded; the outer container inner layer 83a and the inner container outer layer 82b were made using polyamide which is a superior gas barrier property resin; and the outer container outer layer 83b and the inner container inner layer 82a were made using heat and water resistant polycarbonate which is a water resistant resin. These respective resins were formed into layers of 1.5 mm each. Next, a space 84 having a width of 5 mm was made between the inner and outer containers 82 and 83. In addition, contact preventing projection 90 (refer to FIG. 6) was formed by arranging eight projections 17 having a width of 0.8 mm and a height of 3 mm, as shown in FIG. 6, were arranged in a radiating manner with the center of the central section of the outer layer of the bottom of the inner container 82 as the center.

In addition, the sealing plate 89 was also made by means of multi-layer molding polyamide resin and heat and water resistant polycarbonate resin into a flat shape with the thickness of each resin layer being 1.0 mm.

A penetrating hole 88 having a diameter of 1 mm was formed in the center of the bottom of outer container 83. As radiation preventing material 86, aluminum foil was attached to the surface of the inner container outer layer 82b using double sided tape. After doing this, a container having a double-walled structure was obtained by unitarily joining the mouth joining section 85 of inner container 82 and outer container 83 using a vibration welder. After this joining into a single body, the integrated insulated container 81 was removed from the welding machine by being pushed out by an ejection implement. However, no scratches or cracks occurred in the outer container 83 and, as a result, the container 81 could be easily removed.

Next, as in Embodiment 1 and Embodiment 2, and as shown in FIG. 25 and FIG. 26, packing 121 and gas exchange implement 123 were fitted to the outer surface of the bottom of outer container 83 in which penetrating hole 88 had been formed and the air in the space 84 was evacuated to 10 Torr or less through the gas exchange implement 123, the piping 124, and the valve 125 using vacuum pump 126. At this time, as shown in FIG. 26, the inner container 82 (equivalent to number 4 in FIG. 26) and the outer container 83 (equivalent to number 3 in FIG. 26) were deformed by the load of atmospheric pressure due to the vacuum evacuation. However, the penetrating hole 88 was not stopped up by inner container 82 because the bottom of outer container 83 was supported by the contact preventing projection 90 provided on inner container 82.

After that, as shown in FIG. 25, valve 125 was closed, valve 127 was opened, and krypton gas was charged into space 84 from inert gas cylinder 128 to a pressure of approximately atmospheric pressure. After that, the packing 121 and the gas exchange implement 123 were removed, and penetrating hole 88 was sealed by means of sealing plate 89 using a cyanoacrylate-type adhesive agent, thereby forming an insulated container 81.

In the same way, a multi-layer molded insulated lid 101 as shown in FIG. 19 was manufactured.

For this insulated lid 101, each of the bottom surface wall 103 and the top surface wall 102 were multi-layer molded; the bottom surface wall upper layer 103a and the top surface wall lower layer 102b were made using polyamide which is a superior gas barrier property resin, and the bottom surface wall lower layer 103b and the top surface wall upper layer 102a were made using heat and water resistant polycarbonate which is a water resistant resin. Each resin was formed into a layer having a thickness of 1.5 mm. Next, a space 104 having a width of 5 mm was made between the top and bottom surface walls 102 and 103. In addition, contact preventing projection 110 (refer to FIGS. 11A and 11B) was formed by arranging six projections 37 having a width of 0.8 mm and a height of 3 mm, as shown in FIGS. 11A and 11B, in a radiating manner with the center of the central section of the upper layer of the bottom of the bottom surface wall 103 as the center.

In addition, the sealing plate 109 was also made by means of multi-layer molding polyamide resin and heat and water resistant polycarbonate resin into a flat shape with the thickness of each resin layer being 1.0 mm.

A penetrating hole 108 having a diameter of 1 mm was formed in the center of the bottom surface wall 103. As radiation preventing material 106, aluminum foil was attached to the surface of the bottom surface wall upper layer 103a using double sided tape. After doing this, the top surface wall 102 and the bottom surface wall 103 were formed into a single body joining their respective mouth joining sections 85 using a vibration welder. After this joining, the integrated lid 101 was removed from the welding machine by being pushed out by the ejection implement.

However, no scratches or cracks were produced in the bottom surface wall 103 and, as a result, the lid could be easily removed.

Next, as for the above-mentioned insulated container 81, and as shown in FIG. 25 and FIG. 26, packing 121 and gas exchange implement 123 were fitted to the lower surface of the bottom surface wall 103 in which penetrating hole 108 had been formed and the air in the space 104 was evacuated to 10 Torr or less through the gas exchange implement 123, the piping 124, and the valve 125 using vacuum pump 126. At this time, as shown in FIG. 26, the top surface wall 102 and the bottom surface wall 103 were deformed by the load of atmospheric pressure due to the vacuum evacuation. However, the penetrating hole 108 was not stopped up by top surface wall 102 because the top surface wall 102 was supported by the contact preventing projection 110 provided on bottom surface wall 103.

After that, as shown in FIG. 25, valve 125 was closed, valve 127 was opened, and krypton gas was charged into space 104 from inert gas cylinder 128 to a pressure of approximately atmospheric pressure. After that, the packing 121 and the gas exchange implement 123 were removed, and penetrating hole 108 was sealed by means of sealing plate 109 using a cyanoacrylate-type adhesive agent, thereby forming an insulated lid 101.

As a test, 300 cc of 95° C. water were put into the manufactured insulated container 81 and the opening of the insulated container 81 was closed using insulated lid 101, as a result, the temperature of the water after 1 hour had past was 76° C., thereby confirming that the insulated container and insulated lid have excellent heat retaining properties.

Industrial Applicability

The insulated synthetic resin container and the insulated synthetic resin lid of the present invention have contact preventing projections formed on the insulating layer side of one wall of the insulated container and one wall of the insulated lid, which have a double walled structure enclosing an insulating layer into which a gas having low thermal conductivity has been charged, and these contact preventing projections support the other wall when it is elastically deformed during vacuum evacuation. By means of these projections, it is possible to prevent the gas replacement penetrating hole from becoming stopped up by the opposite wall of the insulating layer or the pingate formed in this opposite wall.

Consequently, it is possible to conduct injection molding which uses a pingate to mold the inner and outer container of the insulated container, the inner wall and the outer wall of the insulation layer body of the insulated container; the top surface wall and bottom surface wall of the insulated lid; or the upper wall and lower wall of the lid insulation layer body of the insulated lid, and as result, automation of molding and stabilization of the cycle time is simple.

In addition, since it is possible to perform, without resistance, the vacuum evacuation and the introduction of the gas having low thermal conductivity, it is possible to reduce and make generally uniform the time period of the vacuum evacuation and the time period of the introduction, automation becomes easier, and productivity is improved.

In addition, compared with the great strength required to prevent deformation when conducting conventional vacuum evacuation, the inner and outer container of the insulated container; the inner wall and outer wall of the insulation layer body of the insulated container; the inner container outer layer and the outer container inner layer of the multi-layer molded insulated container; the top surface wall and the bottom surface wall of the insulated lid; the upper wall and the lower wall of the lid insulation layer body of the insulated lid; and the top surface wall lower layer and the bottom surface wall upper layer of the multi-layer molded insulated lid; etc. of the present invention have a satisfactory level of moldability and mechanical strength which is sufficient to allow a great deal of freedom for design.

For example, when using the same resins as are used in convention art, it is possible to reduce wall thicknesses, therefore, compared with conventional insulated synthetic resin containers and insulated synthetic resin lids, it is possible to provide insulated containers and insulated lids which are more compact and yet have the same level of temperature maintaining performance, and, as a result, it is possible to improve stowability and volumetric efficiency.

In addition, there is no need to increase wall thickness when using a low rigidity resin such as polypropylene and it is possible to provide a wide variety of insulated containers and insulated lids in accordance with planning. In addition, it is possible to make the bottom section of the insulated container in a wide flat shape.

In addition, when using foil as the radiation preventing material, a cut out section for the contact preventing projection can be cut in the foil so as to match the position of the contact protecting projections of the present invention, thereby, the manufacturing process can be simplified.

In addition, since the contact protecting projection of the present invention is easily designed and the necessary amount of resin is small, it does not increase costs.

In particular, in the second embodiment of the insulated synthetic resin container and the second embodiment of the insulated synthetic resin lid of the present invention, the thickness of the insulation layer body and the thickness of the lid insulation layer body can be reduced, therefore, there is no increase in cost even when they are molded using superior gas barrier property resin.

Furthermore, if structured such that at least one part of the tip of the contact preventing projection is separated from the opposite surface, even with a contact preventing projection provided, there is little heat loss due to conduction by this projection, the insulating properties of the container and the lid of the present invention are maintained and there is no reduction to the high temperature retaining and low temperature retaining properties.

Up to the present, the lower layer of the top surface wall and the upper layer of the bottom surface wall of a conventional insulated lid, and conventional upper walls, and lower walls required high strength so as not to deform on evacuation; however, the present invention has a satisfactory level of moldability and mechanical strength which is sufficient to allow a great deal of freedom for design. In particular, when the contact preventing projection has a shape which extends radially and protrudes into the insulating layer side, and a container or lid are formed into a single body by joining the inner container and the outer container, the inner wall and the outer wall, or the outer layer of the inner container and the inner layer of the outer container by means of vibration welding, or the like, and this container or lid are removed from the welder, there is little deformation of the container and lid, and cracks and the like do not develop even when pushed out by means of an ejection implement.

In addition, when hot drink is put into an insulated container obtained by means of the present invention, the gas having low thermal conductivity, which is enclosed in the space which forms the insulating layer of the insulated container and insulated lid, is heated and expands, and even when the load of this expansion is carried by the walls, it is possible to obtain strength against the burden of the expansion due to the provision of radiating contact preventing projection, particularly in the flat surface.

What is claimed:

1. An insulated synthetic resin container comprising:

an insulating layer formed by enclosing a gas having low thermal conductivity having a thermal conductivity lower than air into a space formed between an inner container and an outer container of a double walled container in which said inner container and said outer container have been joined into a single body, wherein a gas replacement penetrating hole is formed in a center of a bottom of one of said inner container and said outer container; and a contact preventing projection is provided in the vicinity of said gas replacement penetrating hole projecting into said insulating layer from at least one of a surface in which said gas replacement penetrating hole is formed and a surface which is opposite said surface in which said gas replacement penetrating hole is formed.

2. An insulated synthetic resin container according to claim 1, wherein at least a part of the tip of said contact preventing projection is separated from an opposite surface.

3. An insulated synthetic resin container which comprises an insulation layer body housed within a space formed between an inner container and an outer container of a double walled container in which said inner container and said outer container are joined into a single body, and said insulation layer body comprises an insulating layer formed by enclosing a gas having low thermal conductivity having a thermal conductivity lower than air in a space formed between an inner wall and an outer wall of a double walled structure in which said inner wall and said outer wall are joined into a single body, wherein a gas replacement penetrating hole is formed in a center of a bottom of one of said inner wall and said outer wall; and a contact preventing projection is provided in the vicinity of said gas replacement penetrating hole, projecting into said insulating layer from at least one of a surface in which said gas replacement penetrating hole is formed and a surface which is opposite said surface in which said gas replacement penetrating hole is formed.

4. An insulated synthetic resin container according to claim 3, wherein at least a part of the tip of said contact preventing projection is separated from an opposite surface.

5. An insulated synthetic resin container comprising an insulating layer formed by enclosing a gas having low thermal conductivity having a thermal conductivity lower than air into a space formed between an inner container and an outer container of a double walled container in which said inner container and said outer container have been joined into a single body and said inner container and said outer container have been formed by means of multi-layer molding in which synthetic resins having different functional properties are made into layers, wherein a gas replacement penetrating hole is formed in a center of a bottom of one of said inner container and said outer container; and a contact preventing projection is provided in the vicinity of said gas replacement penetrating hole projecting into said insulating layer from at least one of a surface in which said gas replacement penetrating hole is formed and a surface which is opposite said surface in which said gas replacement penetrating hole is formed.

6. An insulated synthetic resin container according to claim 5, wherein at least a part of the tip of said contact preventing projection is separated from an opposite surface.

7. An insulated synthetic resin lid comprising an insulating layer formed by enclosing a gas having low thermal conductivity having a thermal conductivity lower than air in a space formed between a top surface wall and a bottom surface wall of a double walled lid in which said top surface wall and said bottom surface wall have been joined into a single body, wherein a gas replacement penetrating hole is formed in a center of the wall of one of said top surface wall and said bottom surface wall; and a contact preventing projection is provided in the vicinity of said gas replacement penetrating hole projecting into said insulating layer from at least one of a surface in which said gas replacement penetrating hole is formed and a surface which is opposite said surface in which said gas replacement penetrating hole is formed.

8. An insulated synthetic resin lid according to claim 7, wherein at least a part of the tip of said contact preventing projection is separated from an opposite surface.

9. An insulated synthetic resin lid which comprises an insulation layer body housed within a space formed between a top surface wall and a bottom surface wall of a double walled lid in which said top surface wall and said bottom surface wall are joined into a single body, and said insulation layer body comprises an insulating layer formed by enclosing a gas having low thermal conductivity having a thermal conductivity lower than air in a space formed between an upper wall and a lower wall of a double walled structure in which said upper wall and said lower wall are joined into a single body, wherein a gas replacement penetrating hole is formed in a center of one of said upper wall and said lower wall; and a contact preventing projection is provided in the vicinity of said gas replacement penetrating hole, projecting into said insulating layer from at least one of a surface in which said gas replacement penetrating hole is formed and a surface which is opposite said surface in which said gas replacement penetrating hole is formed.

10. An insulated synthetic resin lid according to claim 9, wherein at least a part of the tip of said contact preventing projection is separated from an opposite surface.

11. An insulated synthetic resin lid comprising an insulating layer formed by enclosing a gas having low thermal conductivity having a thermal conductivity lower than air into a space formed between a top surface wall and a bottom surface wall of a double walled lid in which said top surface wall and said bottom surface wall have been joined into a single body and said bottom surface wall and said top surface wall have been formed by means of multi-layer molding in which synthetic resins having different functional properties are made into layers, wherein a gas replacement penetrating hole is formed in a center of one of said top surface wall and said bottom surface wall; and a contact preventing projection is provided in the vicinity of said gas replacement penetrating hole projecting into said insulating layer from at least one of a surface in which said gas replacement penetrating hole is formed and a surface which is opposite said surface in which said gas replacement penetrating hole is formed.

12. An insulated synthetic resin lid according to claim 11, wherein at least a part of the tip of said contact preventing projection is separated from an opposite surface.

* * * * *

UNITED STATES PATENT AND TRADEMARK OFFICE
CERTIFICATE OF CORRECTION

PATENT NO.   : 5,913,445
DATED        : June 22, 1999
INVENTOR(S)  : Takafumi FUJII et al It is certified that errors appear in the above-identified patent and that said Letters Patent is hereby corrected as shown below:

Title page, [86] PCT No., Change "PCT/US97/07892" to --PCT/JP97/02615--.

[22] PCT Filing Date, "May 12, 1997" Should be --July 29, 1997

Signed and Sealed this

Twenty-second Day of May, 2001

Attest:

NICHOLAS P. GODICI

Attesting Officer

Acting Director of the United States Patent and Trademark Office